United States Patent
Takahashi et al.

(10) Patent No.: US 11,897,573 B2
(45) Date of Patent: Feb. 13, 2024

(54) OPERATING DEVICE FOR HUMAN-POWERED VEHICLE

(71) Applicant: SHIMANO INC., Sakai (JP)

(72) Inventors: Ayako Takahashi, Sakai (JP); Takuma Sakai, Sakai (JP); Yasuyuki Komada, Sakai (JP); Yusuke Nishikawa, Sakai (JP); Kentaro Kosaka, Sakai (JP); Takaya Masuda, Sakai (JP); Katsuhiro Tachibana, Sakai (JP); Shun Kakehashi, Sakai (JP); Yuichiro Hidaka, Sakai (JP); Fumihide Numata, Sakai (JP)

(73) Assignee: SHIMANO INC., Sakai (JP)

( * ) Notice: Subject to any disclaimer, the term of this patent is extended or adjusted under 35 U.S.C. 154(b) by 132 days.

(21) Appl. No.: 16/950,831

(22) Filed: Nov. 17, 2020

(65) Prior Publication Data
US 2022/0063755 A1     Mar. 3, 2022

Related U.S. Application Data

(63) Continuation-in-part of application No. 17/003,948, filed on Aug. 26, 2020, now abandoned.

(51) Int. Cl.
*B62K 23/02* (2006.01)
*G05G 1/04* (2006.01)

(52) U.S. Cl.
CPC .............. *B62K 23/02* (2013.01); *G05G 1/04* (2013.01)

(58) Field of Classification Search
CPC .......... B62K 23/02; B62K 23/06; G05G 1/04; B62J 6/24; B62J 43/30; B62L 3/02; B62L 3/023; B62L 3/026; B62M 25/08; F15B 7/08
See application file for complete search history.

(56) References Cited

U.S. PATENT DOCUMENTS

| | | | |
|---|---|---|---|
| 6,073,730 A | 6/2000 | Abe | |
| 7,760,078 B2 | 7/2010 | Miki et al. | |
| 9,434,437 B2 | 9/2016 | Van Dyke et al. | |
| 10,486,658 B2 | 11/2019 | Komatsu et al. | |
| 2003/0032327 A1 | 2/2003 | LaBonte | |

(Continued)

FOREIGN PATENT DOCUMENTS

| | | | |
|---|---|---|---|
| CN | 1202437 | 12/1998 | |
| CN | 1772559 A | * 5/2006 | ............ B62M 25/08 |

(Continued)

OTHER PUBLICATIONS

Machine translation of CN 106515976 A, Kosaka et al., Mar. 22, 2017 (Year: 2017).*

(Continued)

*Primary Examiner* — Vinh Luong
(74) *Attorney, Agent, or Firm* — MORI & WARD, LLP

(57) ABSTRACT

An operating device for a human-powered vehicle comprises a base member, an operating member, a first substrate, and a second substrate. The operating member is movably coupled to the base member. The first substrate is provided to one of the base member and the operating member. The second substrate is provided to the one of the base member and the operating member. The second substrate is separate from the first substrate.

20 Claims, 24 Drawing Sheets

(56) References Cited

U.S. PATENT DOCUMENTS

| | | | |
|---|---|---|---|
| 2007/0178715 A1* | 8/2007 | Fujii | B62K 23/06 439/34 |
| 2008/0210046 A1 | 9/2008 | De Perini | |
| 2009/0315692 A1 | 12/2009 | Miki et al. | |
| 2012/0096978 A1 | 4/2012 | Voshell et al. | |
| 2014/0102237 A1 | 4/2014 | Jordan et al. | |
| 2016/0311499 A1 | 10/2016 | Kasai | |
| 2017/0080993 A1 | 3/2017 | Bierwerth et al. | |
| 2017/0088234 A1* | 3/2017 | Komada | B62L 3/023 |
| 2017/0305395 A1* | 10/2017 | Komatsu | B62L 3/023 |
| 2017/0305490 A1 | 10/2017 | Komatsu et al. | |
| 2018/0001960 A1 | 1/2018 | Pasqua | |
| 2018/0057102 A1 | 3/2018 | Komatsu et al. | |
| 2018/0057103 A1 | 3/2018 | Komatsu et al. | |
| 2018/0057104 A1* | 3/2018 | Komatsu | B62M 25/08 |
| 2019/0002057 A1 | 1/2019 | Jordan et al. | |
| 2019/0351965 A1 | 11/2019 | Syouge et al. | |
| 2019/0382074 A1 | 12/2019 | Bierwerth et al. | |
| 2019/0382081 A1 | 12/2019 | Bierwerth et al. | |
| 2020/0010143 A1 | 1/2020 | Kao | |
| 2020/0010150 A1 | 1/2020 | Tasoniero | |
| 2021/0139102 A1 | 5/2021 | Komada et al. | |
| 2021/0144453 A1 | 5/2021 | Komada et al. | |
| 2021/0339819 A1* | 11/2021 | Hidaka | B62K 23/06 |
| 2021/0339823 A1* | 11/2021 | Komada | B62M 6/45 |
| 2022/0063754 A1* | 3/2022 | Masuda | B60L 3/02 |

FOREIGN PATENT DOCUMENTS

| | | | | |
|---|---|---|---|---|
| CN | 203391907 U | * | 1/2014 | B62J 6/04 |
| CN | 105947081 A | * | 9/2016 | B62L 3/02 |
| CN | 106515976 A | * | 3/2017 | B62K 23/06 |
| CN | 107010156 | | 8/2017 | |
| CN | 107303929 | | 10/2017 | |
| CN | 107303934 | | 10/2017 | |
| CN | 107776814 | | 3/2018 | |
| DE | 102016010801 | | 3/2017 | |
| DE | 10 2018 009 621 | | 7/2019 | |
| DE | 10 2019 004 154 | | 12/2019 | |
| EP | 0811527 A2 | * | 12/1997 | B60R 16/00 |
| EP | 0811530 A2 | * | 12/1997 | B60R 16/02 |
| EP | 3590816 A1 | * | 1/2020 | B62M 25/08 |
| TW | I667169 B | | 8/2019 | |

OTHER PUBLICATIONS

Machine translation of CN 105947081 A, Fujimoto et al., Sep. 21, 2016 (Year: 2016).*

Define along, Microsoft Bing, Aug. 11, 2022 (Year: 2022).*

Machine translation of CN 203391907 U, Mishima et al., Jan. 15, 2014 (Year: 2014).*

Machine translation of CN 1772559 A, Fukuda, May 17, 2006 (Year: 2006).*

Office Action issued by the United States Patent and Trademark Office for the co-pending U.S. Appl. No. 16/683,200, dated Apr. 14, 2022.

Office Action with Form PTO-892 Notice of References Cited issued by the United States Patent and Trademark Office for the co-pending U.S. Appl. No. 16/950,829, dated May 12, 2022.

"What are primary batteries?", UPS Battery, upsbatterycenter.com, 2018.

"Primary Battery vs Secondary Battery / Difference between Primary Battery and Secondary Battery", RF Wireless World, 2012.

"What kind of batteries exist?", Visblue A/S 2020

"Vuka Shift AXS User Manual", SRAM, LLC., 2020.

Office Action with Form PTO-892 Notice of References Cited issued by the United States Patent and Trademark Office for the co-pending U.S. Appl. No. 16/683,212, dated Jul. 15, 2021.

Advisory Action issued by the United States Patent and Trademark Office for the co-pending U.S. Appl. No. 16/864,165, dated Feb. 4, 2022.

Office Action issued by the United States Patent and Trademark Office for the co-pending U.S. Appl. No. 16/864,165, dated Feb. 15, 2022.

Office Action with Form PTO-892 Notice of References Cited issued by the United States Patent and Trademark Office for the co-pending U.S. Appl. No. 16/683,212, dated Feb. 9, 2022.

Office Action with Form PTO-892 Notice of References Cited issued by the United States Patent and Trademark Office for the co-pending U.S. Appl. No. 16/683,212, dated Feb. 8, 2021.

Office Action with Form PTO-892 Notice of References Cited issued by the United States Patent and Trademark Office for the co-pending U.S. Appl. No. 16/683,200, dated Dec. 9, 2021.

Office Action with Form PTO-892 Notice of References Cited issued by the United States Patent and Trademark Office for the co-pending U.S. Appl. No. 16/864,165, dated Nov. 9, 2021.

Define plane, Google Search, Nov. 17, 2021.

Definition of plane, merriam-webster.com, Nov. 16, 2021.

Definition of area, merriam-webster.com, Nov. 16, 2021.

Define reference plane, Google Search, Nov. 16, 2021.

Office Action with Form PTO-892 Notice of References Cited issued by the United States Patent and Trademark Office for the co-pending U.S. Appl. No. 16/683,206, dated Nov. 22, 2021.

Define electrical contact, Google Search, May 7, 2021 (Year: 2021).

Office Action with Form PTO-892 Notice of References Cited issued by the United States Patent and Trademark Office for the co-pending U.S. Appl. No. 16/950,829, dated May 12, 2021.

Office Action with Form PTO-892 Notice of References Cited issued by the United States Patent and Trademark Office for the co-pending U.S. Appl. No. 16/864,165, dated May 14, 2021.

* cited by examiner

OPERATING DEVICE FOR HUMAN-POWERED VEHICLE

CROSS-REFERENCE TO RELATED APPLICATIONS

The present application is a continuation-in-part application of the U.S. patent application Ser. No. 17/003,948 filed Aug. 26, 2020. The contents of this application are incorporated herein by reference in their entirety.

BACKGROUND OF THE INVENTION

Field of the Invention

The present invention relates to an operating device for a human-powered vehicle.

Discussion of the Background

A human-powered vehicle includes an operating unit configured to operate an operated unit.

SUMMARY OF THE INVENTION

In accordance with a first aspect of the present invention, an operating device for a human-powered vehicle comprises a base member, an operating member, a first substrate, and a second substrate. The operating member is movably coupled to the base member. The first substrate is provided to one of the base member and the operating member. The second substrate is provided to the one of the base member and the operating member. The second substrate is separate from the first substrate.

With the operating device according to the first aspect, it is possible to improve the flexibility of design of electric components in the operating device.

In accordance with a second aspect of the present invention, the operating device according to the first aspect is configured so that the first substrate extends along a first reference plane. The second substrate extends along a second reference plane different from the first reference plane.

With the operating device according to the second aspect, it is possible to efficiently arrange the first substrate and the second substrate depending on the shape of the operating device.

In accordance with a third aspect of the present invention, the operating device according to the second aspect is configured so that the first reference plane is non-parallel to the second reference plane.

With the operating device according to the third aspect, it is possible to more efficiently arrange the first substrate and the second substrate depending on the shape of the operating device.

In accordance with a fourth aspect of the present invention, the operating device according to the second or third aspect is configured so that the first reference plane is perpendicular to the second reference plane.

With the operating device according to the fourth aspect, it is possible to more efficiently arrange the first substrate and the second substrate depending on the shape of the operating device.

In accordance with a fifth aspect of the present invention, the operating device according to any one of the second to fourth aspects is configured so that the first substrate has a first minimum length defined in a first direction along the first reference plane. The second substrate has a second minimum length defined in a second direction along the second reference plane. At least one of the first minimum length and the second minimum length is larger than a minimum distance defined between the first substrate and the second substrate.

With the operating device according to the fifth aspect, it is possible to efficiently arrange the first substrate and the second substrate depending on the shape of the operating device.

In accordance with a sixth aspect of the present invention, the operating device according to any one of the first to fifth aspects further comprises a third substrate configured to electrically connect the first substrate to the second substrate, the third substrate being a different substrate from the first substrate and the second substrate.

With the operating device according to the sixth aspect, it is possible to electrically connect the first substrate and the second substrate which are separately provided from each other.

In accordance with a seventh aspect of the present invention, the operating device according to the fifth aspect is configured so that the third substrate includes a flexible member configured to electrically connect the first substrate to the second substrate.

With the operating device according to the seventh aspect, it is possible to improve the flexibility of arrangement of the first substrate and the second substrate using the third substrate.

In accordance with an eighth aspect of the present invention, the operating device according to the sixth or seventh aspect further comprises a substrate support configured to support the third substrate relative to at least one of the operating member, the base member, the first substrate and the second substrate.

With the operating device according to the eighth aspect, it is possible to reduce the relative movement of the third substrate relative to other members, improving durability of the third substrate.

In accordance with a ninth aspect of the present invention, the operating device according to the eighth aspect is configured so that the substrate support includes an elastic member.

With the operating device according to the ninth aspect, it is possible to absorb the relative movement of the third substrate relative to other members, improving effectively durability of the third substrate.

In accordance with a tenth aspect of the present invention, the operating device according to any one of the first to ninth aspects is configured so that the first substrate and the second substrate are provided to the base member.

With the operating device according to the tenth aspect, it is possible to utilize the base member as a portion to which the first substrate and the second substrate are provided.

In accordance with an eleventh aspect of the present invention, the operating device according to any one of the first to tenth aspects is configured so that the base member extends in a longitudinal direction and includes a first end portion configured to be coupled to a handlebar and a second end portion opposite to the first end portion in the longitudinal direction. At least one of the first substrate and the second substrate is accommodated at the second end portion.

With the operating device according to the eleventh aspect, it is possible to utilize the second end portion as a portion at which at least one of the first substrate and the second substrate is accommodated.

In accordance with a twelfth aspect of the present invention, the operating device according to any one of the first to eleventh aspects is configured so that the operating member is pivotally coupled to the base member about a pivot axis. The first substrate extends along the pivot axis.

With the operating device according to the twelfth aspect, it is possible to efficiently arrange the first substrate relative to the pivot axis.

In accordance with a thirteenth aspect of the present invention, the operating device according to any one of the first to twelfth aspects further comprises at least one first electric component and at least one second electric component. The at least one first electric component is electrically mounted on the first substrate. The at least one second electric component is electrically mounted on the second substrate. A first total number of the at least one first electric component is different from a second total number of the at least one second electric component.

With the operating device according to the thirteenth aspect, it is possible to electrically mount a larger total number of electric components on one of the first substrate and the second substrate. Thus, it is possible to use one of the first substrate and the second substrate as a main substrate.

In accordance with a fourteenth aspect of the present invention, the operating device according to the thirteenth aspect is configured so that at least one of the first substrate and the second substrate is replaceable with an additional substrate on which at least one third electric component is electrically mounted, the at least one third electric component having a third total number different from at least one of the first total number and the second total number.

With the operating device according to the fourteenth aspect, it is possible to improve the flexibility of design of the operating device by replacing one of the first substrate and the second substrate with the additional substrate.

In accordance with a fifteenth aspect of the present invention, the operating device according to the fourteenth aspect is configured so that the second total number is larger than the first total number. The first substrate is replaceable with the additional substrate.

With the operating device according to the fifteenth aspect, it is possible to replace the first substrate with the additional substrate without replacing the second substrate serving as the main substrate.

In accordance with a sixteenth aspect of the present invention, the operating device according to the fourteenth or fifteenth aspect is configured so that the at least one second electric component includes at least one of a controller and an electric power source. The first substrate is replaceable with the additional substrate.

With the operating device according to the sixteenth aspect, it is possible to replace the first substrate with the additional substrate without replacing the second substrate serving as the main substrate.

In accordance with a seventeenth aspect of the present invention, an operating device for a human-powered vehicle comprises a base member, an operating member, a first substrate, a second substrate, at least one first electric component, and at least one second electric component. The operating member is movably coupled to the base member. The first substrate is provided to one of the base member and the operating member. The second substrate is provided to one of the base member and the operating member. The at least one first electric component is electrically mounted on the first substrate. The at least one second electric component is electrically mounted on the second substrate. A first total number of the at least one first electric component is different than a second total number of the at least one second electric component. The first substrate is replaceable with an additional substrate on which at least one third electric component having a third total number different from the first total number and the second total number.

With the operating device according to the seventeenth aspect, it is possible to improve the flexibility of design of the operating device by replacing one of the first substrate and the second substrate with the additional substrate.

In accordance with an eighteenth aspect of the present invention, the operating device according to the seventeenth aspect is configured so that the second total number of the at least one second electric component is larger than the first total number of the at least one first electric component.

With the operating device according to the eighteenth aspect, it is possible to replace the first substrate with the additional substrate without replacing the second substrate serving as the main substrate.

In accordance with a nineteenth aspect of the present invention, the operating device according to the seventeenth or eighteenth aspect is configured so that the at least one second electric component includes at least one of a controller, an electric power source, and a wireless communicator.

With the operating device according to the nineteenth aspect, it is possible to replace the first substrate with the additional substrate without replacing the second substrate serving as the main substrate.

In accordance with a twentieth aspect of the present invention, the operating device according to the nineteenth aspect is configured so that the at least one first electric component includes a switch electrically mounted on the first substrate.

With the operating device according to the twentieth aspect, it is possible to replace the first substrate on which the switch is electrically mounted with the additional substrate on which another switch is electrically mounted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
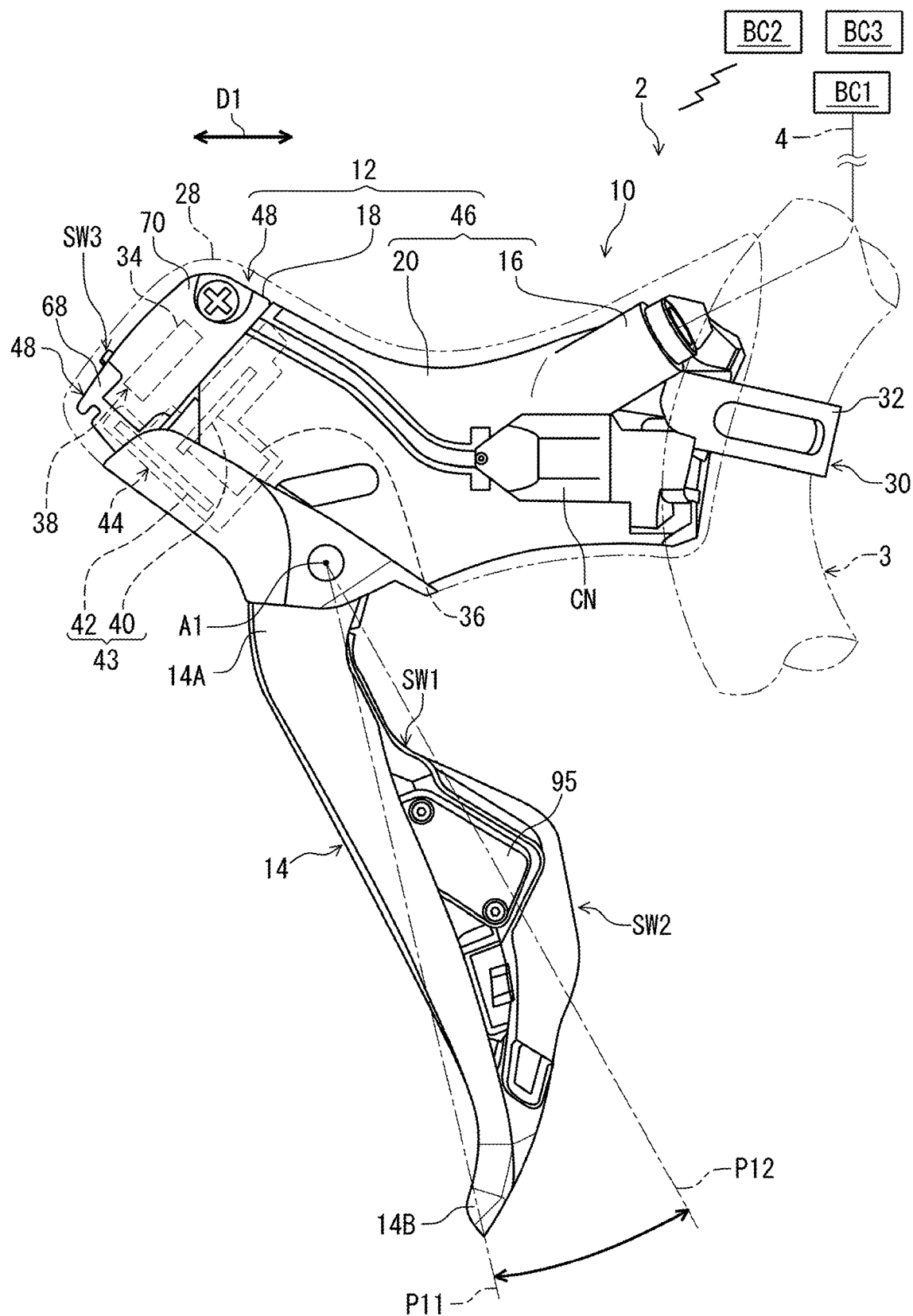
FIG. 1 is a side elevational view of an operating device in accordance with an embodiment.

The embodiment(s) will now be described with reference to the accompanying drawings, wherein like reference numerals designate corresponding or identical elements throughout the various drawings.

As seen in FIG. 1, an operating device 10 for a human-powered vehicle 2 is configured to be mounted to a handlebar 3. In the present embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar. The operating device 10 can be mounted to other portions in the human-powered vehicle 2.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The operating device 10 is operatively coupled to at least one device to operate the at least one device. In the present embodiment, the operating device 10 is operatively coupled to an operated device BC1 such as a brake device. The operating device 10 is operatively coupled to the operated device BC1 via a hydraulic hose 4. However, the operating device 10 can be operatively coupled to a mechanical component such as a brake device via a mechanical control cable including an inner wire. The operated device BC1 can include devices other than a brake device.

The operating device 10 is electrically connected to an electric component BC2 and an additional electric component BC3. In the present embodiment, the operating device 10 is wirelessly connected to the electric component BC2 and the additional electric component BC3. However, the operating device 10 is connected to the electric component BC2 and the additional electric component BC3 via an electrical control cable.

Examples of the electric component BC2 and the additional electric component BC3 include an additional or satellite operating device, an adjustable seatpost, a suspension, a gear changing device, a brake device, a lighting device, and a display device. In the present embodiment, the electric component BC2 includes a gear shifting device such as a derailleur. The additional electric component BC3 includes an adjustable seatpost. However, the electric component BC2 and the additional electric component BC3 are not limited to the above devices.

In the present embodiment, the operating device 10 is a right-hand side operating/control device configured to be operated by the rider's right hand to actuate the operated device BC1. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the operating device 10 or other components, should be interpreted relative to the human-powered vehicle 2 equipped with the operating device 10 as used in an upright riding position on a horizontal surface.

The operating device 10 comprises switches SW1, SW2, and SW3. The switch SW1 is configured to be activated in response to a user input. The switch SW2 is configured to be activated in response to a user input. The switch SW3 is configured to be activated in response to a user input. Examples of the switches SW1, SW2, and SW3 include a push-button switch, a tactile switch, a toggle switch, a dial switch, and a slide switch. In the present embodiment, the electric component BC2 is configured to be operated in response to the user inputs of the switches SW1 and SW2. The additional electric component BC3 is configured to be operated in response to the user input of the switch SW3. For example, the electric component BC2 is configured to upshift and downshift in response to the user inputs received by the switches SW1 and SW2. The additional electric component BC3 is configured to change a state of the additional electric component BC3 between a lock state and an adjustable state in response to the user input received by the switch SW3. However, each of the switches SW1 to SW3 can be used to operate other devices.

As seen in FIG. 1, the operating device 10 for the human-powered vehicle 2 comprises a base member 12 and an operating member 14. The base member 12 extends in a longitudinal direction D1. The base member 12 includes a first end portion 16 and a second end portion 18. The first end portion 16 is configured to be coupled to the handlebar. The second end portion 18 is opposite to the first end portion 16 in the longitudinal direction D1. The second end portion 18 constitutes a free end portion of the base member 12. The base member 12 includes a grip portion 20 provided between the first end portion 16 and the second end portion 18. The grip portion 20 is provided between the first end portion 16 and the second end portion 18 in the longitudinal direction D1.

The operating member 14 is movably coupled to the base member 12. The operating member 14 is pivotally coupled to the base member 12 about a pivot axis A1. The pivot axis A1 is provided closer to the second end portion 18 than to the first end portion 16. The operating member 14 includes a proximal end portion 14A and a distal end portion 14B opposite to the proximal end portion 14A. The operating member 14 extends from the proximal end portion 14A to the distal end portion 14B. The proximal end portion 14A is closer to the pivot axis A1 than the distal end portion 14B. The distal end portion 14B is farther from the proximal end portion 14A than the pivot axis A1 in a longitudinal direction D1 of the operating member 14. In the present embodiment, the distal end portion 14B is the farthest from the proximal end portion 14A in the operating member 14 and constitutes a free end portion of the operating member 14. The distal end portion 14B is provided below the pivot axis A1 and the proximal end portion 14A in a mounting state where the first end portion 16 is coupled to the handlebar 3.

The operating member 14 is pivotable relative to the base member 12 between a rest position P11 and an operated position P12 about the pivot axis A1. The operating device 10 includes a pivot shaft 24 defining the pivot axis A1. The pivot shaft 24 pivotally couples the operating member 14 to the base member 12. In the present embodiment, the rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a device such as the operated device BC1.

The base member 12 includes a hydraulic unit 26 provided in the base member 12. The hydraulic unit 26 is configured to generate hydraulic pressure in response to a movement of the operating member 14. For example, the hydraulic unit 26 includes a cylinder bore, a piston, and a reservoir. Since the hydraulic unit 26 includes structures which have been known, they will not be described in detail here for the sake of brevity. The operating member 14 can be operatively coupled to another structure instead of the hydraulic unit 26. For example, the operating member 14 can be operatively coupled to a mechanical control cable such as a Bowden cable so as to operate the operated device BC1.

The operating device 10 further comprises a grip cover 28. The grip cover 28 is configured to be attached to the base member 12 so as to at least partly cover the base member 12 in a state where the grip cover 28 is attached to the base member 12. For example, the grip cover 28 is made of a non-metallic material such as an elastic material. Examples of the elastic material include rubber. A rider sometimes grips the base member 12 (e.g., the grip portion 20) and leans on the base member 12 (e.g., the grip portion 20) through the grip cover 28 during riding. The grip cover 28 can be omitted from the operating device 10.

The switches SW1 and SW2 are mounted to the operating member 14 to be movable relative to the base member 12 along with the operating member 14. The switch SW3 is mounted to the base member 12. The switch SW3 is provided to the second end portion 18. The switch SW3 is provided between the base member 12 and the grip cover 28. The switch SW3 is configured to be operated by the user via the grip cover 28. However, the positions of the switches SW1, SW2, and SW3 are not limited to this embodiment.

The operating device 10 further comprises a mounting structure 30 configured to couple the first end portion 16 to the handlebar 3. The mounting structure 30 preferably includes a band clamp 32 and a tightening member (not shown). The mounting structure 30 can include other structures which is similar to the band clamp 32 and which is used in a road shifter for mounting to a drop-down handlebar.

As seen in FIG. 1, the operating device 10 comprises a first electric power source 34. In the present embodiment, for example, the first electric power source 34 includes a primary battery. The first electric power source 34 is configured not to be rechargeable. The primary battery includes a button cell shaped as a flat cylinder. However, the first electric power source 34 is not limited to the primary battery. The first electric power source 34 can also be referred to as an electric power source 34.

The operating device 10 for the human-powered vehicle 2 comprises a second electric power source 36. The second electric power source 36 is separate from the first electric power source 34. Examples of the second electric power source 36 include a secondary battery and a capacitor. In the present embodiment, the second electric power source 36 includes a secondary battery. The second electric power source 36 is configured to be rechargeable using electric power. However, the second electric power source 36 is not limited to the secondary battery. The second electric power source 36 can also be referred to as an electric power source 36.

The first electric power source 34 is provided to one of the base member 12 and the operating member 14. The second electric power source 36 is provided to one of the base member 12 and the operating member 14. At least one of the accommodating structure 38 and the second electric power source 36 is provided to the second end portion 18. In the present embodiment, the first electric power source 34 is provided to the base member 12. The second electric power source 36 is provided to the base member 12. The accommodating structure 38 and the second electric power source 36 are provided to the second end portion 18. However, the first electric power source 34 can be provided to the operating member 14. The second electric power source 36 can be provided to the operating member 14. At least one of the accommodating structure 38 and the second electric power source 36 can be provided to other portions other than the second end portion 18 in the base member 12. At least one of the accommodating structure 38 and the second electric power source 36 can be provided to the operating member 14.

The operating device 10 for the human-powered vehicle 2 comprises an accommodating structure 38. The base member 12 includes the accommodating structure 38. The accommodating structure 38 configured to accommodate the first electric power source 34. The accommodating structure 38 is provided to the second end portion 18. The accommodating structure 38 is disposed at a location which is the farthest from the first end portion 16 in the second end portion 18 along the longitudinal direction D1 as viewed along the pivot axis A1. However, the accommodating structure 38 can be provided to portions other than the second end portion 18 in the base member 12 or other than the base member 12 (e.g., the operating member 14) in the operating device 10.

The operating device 10 for the human-powered vehicle 2 comprises a first substrate 40. The first substrate 40 is provided to one of the base member 12 and the operating member 14. The operating device 10 for the human-powered vehicle 2 comprises a second substrate 42. The second substrate 42 is provided to the one of the base member 12 and the operating member 14. The second substrate 42 is separate from the first substrate 40. At least one of the first substrate 40 and the second substrate 42 is accommodated at the second end portion 18.

In the present embodiment, the first substrate 40 and the second substrate 42 are provided to the base member 12. The first substrate 40 and the second substrate 42 are accommodated at the second end portion 18. However, at least one of the first substrate 40 and the second substrate 42 can be provided to the operating member 14. At least one of the first substrate 40 and the second substrate 42 can be provided to other parts other than the second end portion 18 in the base member 12. The second substrate 42 can be integrally provided with the first substrate 40 as a one-piece unitary member. The first substrate 40 can also be referred to as first circuitry or a first circuit board. The second substrate 42 can also be referred to as second circuitry or a second circuit board. The operating device 10 for the human-powered vehicle 2 comprises circuitry 43. The circuitry 43 includes the first substrate 40 and the second substrate 42.

The operating device 10 comprises a connector CN to which at least one electric control cable is to be detachably connected. The connector CN is attached to the base member 12. In the present embodiment, the connector CN includes a plurality of connection ports configured to detachably receive a plurality of electric control cables. The circuitry 43 is configured to be electrically connected to the first electric power source 34, the second electric power source 36, the switches SW1, SW2 and SW3, and the connector CN. The connector CN can include one connection port or at least three connection ports.

The term "detachable and/or attachable," as used herein, encompasses a configuration in which an element is repeatedly detachable from and attachable to another element without substantial damage.

The operating device 10 comprises an additional accommodating structure 44. The base member 12 includes the additional accommodating structure 44. The additional accommodating structure 44 is configured to accommodate at least one of the second electric power source 36, the first substrate 40, and the second substrate 42. In the present embodiment, the additional accommodating structure 44 is configured to accommodate the second electric power source 36, the first substrate 40, and the second substrate 42. However, the additional accommodating structure 44 can be configured to accommodate only one or two of the second electric power source 36, the first substrate 40, and the second substrate 42. One of the accommodating structure 38 and the additional accommodating structure 44 can be omitted from the operating device 10.

The base member 12 includes a base body 46 and an accommodating housing 48. The accommodating housing 48 includes the accommodating structure 38 and the additional accommodating structure 44. The accommodating housing 48 is a separate member form the base body 46 and is secured to the base body 46 with a fastener or a bonding structure such as adhesive. The base body 46 includes the first end portion 16 and the grip portion 20 of the base member 12. The operating member 14 is pivotally coupled to the base body 46 about the pivot axis A1. However, the accommodating housing 48 can be integrally provided with the base body 46 as a one-piece unitary member. The position of the accommodating housing 48 in the base member 12 is not limited to the second end portion 18.

Figure 2:
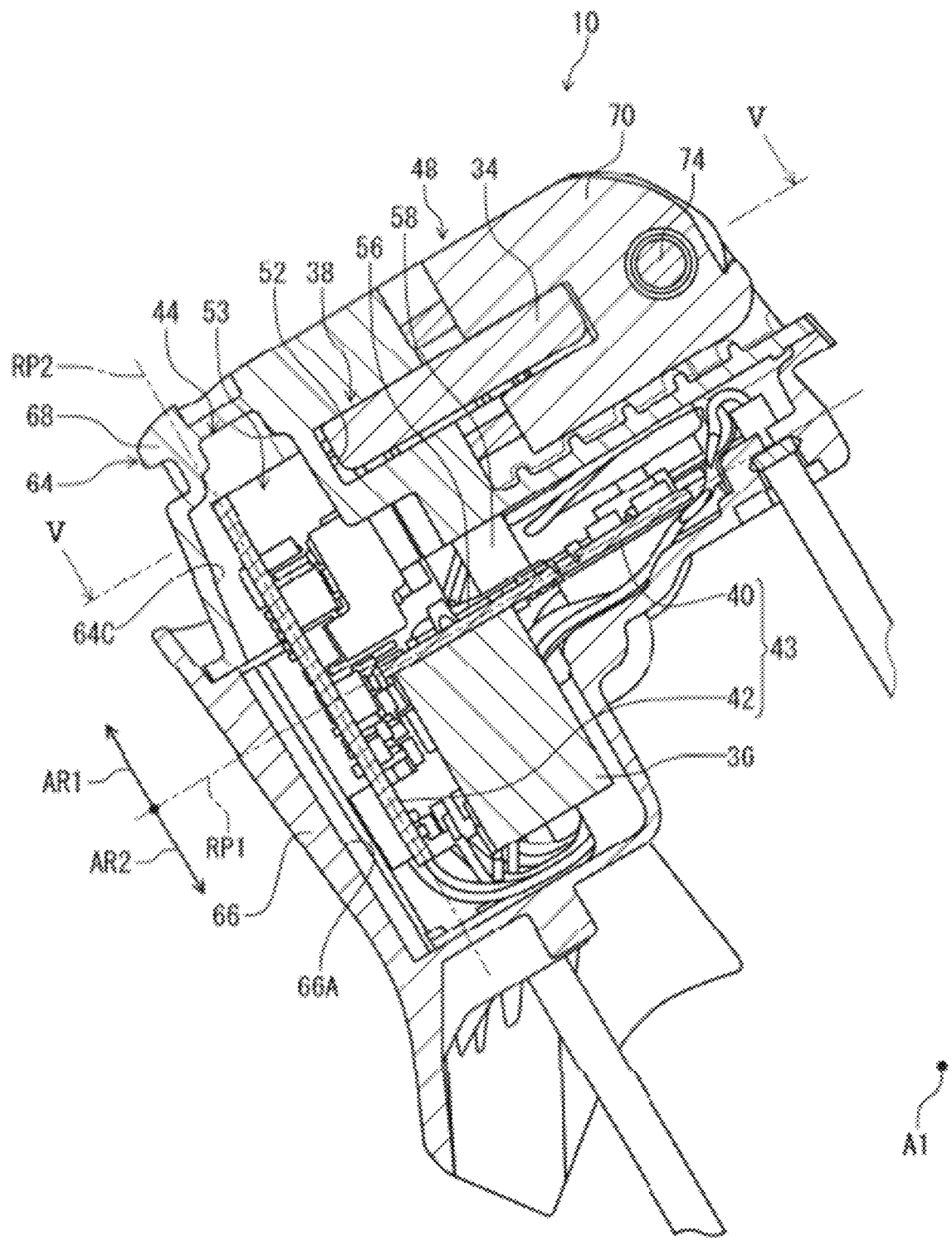
FIG. 2 is a cross-sectional view of the operating device illustrated in FIG. 1 taken along line II-II in FIG. 5.

As seen in FIG. 2, the accommodating structure 38 includes an accommodating space 52 in which the first electric power source 34 is to be provided. The additional accommodating structure 44 includes an additional accommodating space 53 in which at least one of the second electric power source 36, the first substrate 40, and the second substrate 42 is to be provided. In the present embodiment, the additional accommodating structure 44 includes an additional accommodating space 53 in which the second electric power source 36, the first substrate 40, and the second substrate 42 are to be provided.

The first substrate 40 extends along a first reference plane RP1. The second substrate 42 extends along a second reference plane RP2 different from the first reference plane RP1. The first reference plane RP1 is non-parallel to the first reference plane RP1. The first reference plane RP1 is perpendicular to the second reference plane RP2. The first substrate 40 extends along a plane parallel to the pivot axis A1. The first reference plane RP1 is parallel to the pivot axis A1. However, the first reference plane RP1 can be non-perpendicular to the second reference plane RP2. The first reference plane RP1 can be non-parallel to the pivot axis A1.

The first reference plane RP1 defines a first area AR1 and a second area AR2 provided on a reverse side of the first area AR1 with respect to the first reference plane RP1. The accommodating structure 38 is provided in one of the first area AR1 and the second area AR2. The second electric power source 36 is provided in the other of the first area AR1 and the second area AR2. The first substrate 40 is provided between the accommodating structure 38 and the second electric power source 36. In the present embodiment, the accommodating structure 38 is provided in the first area AR1. The second electric power source 36 is provided in the second area AR2. However, the accommodating structure 38 can be provided in the second area AR2. The second electric power source 36 can be provided in the first area AR1.

The second electric power source 36 is electrically connected to the first substrate 40. The second electric power source 36 is electrically mounted on the first substrate 40. However, the second electric power source 36 can be electrically mounted on the second substrate 42 or other substrates. The second electric power source 36 can be electrically connected to the second substrate 42 or other substrates.

Figure 3:
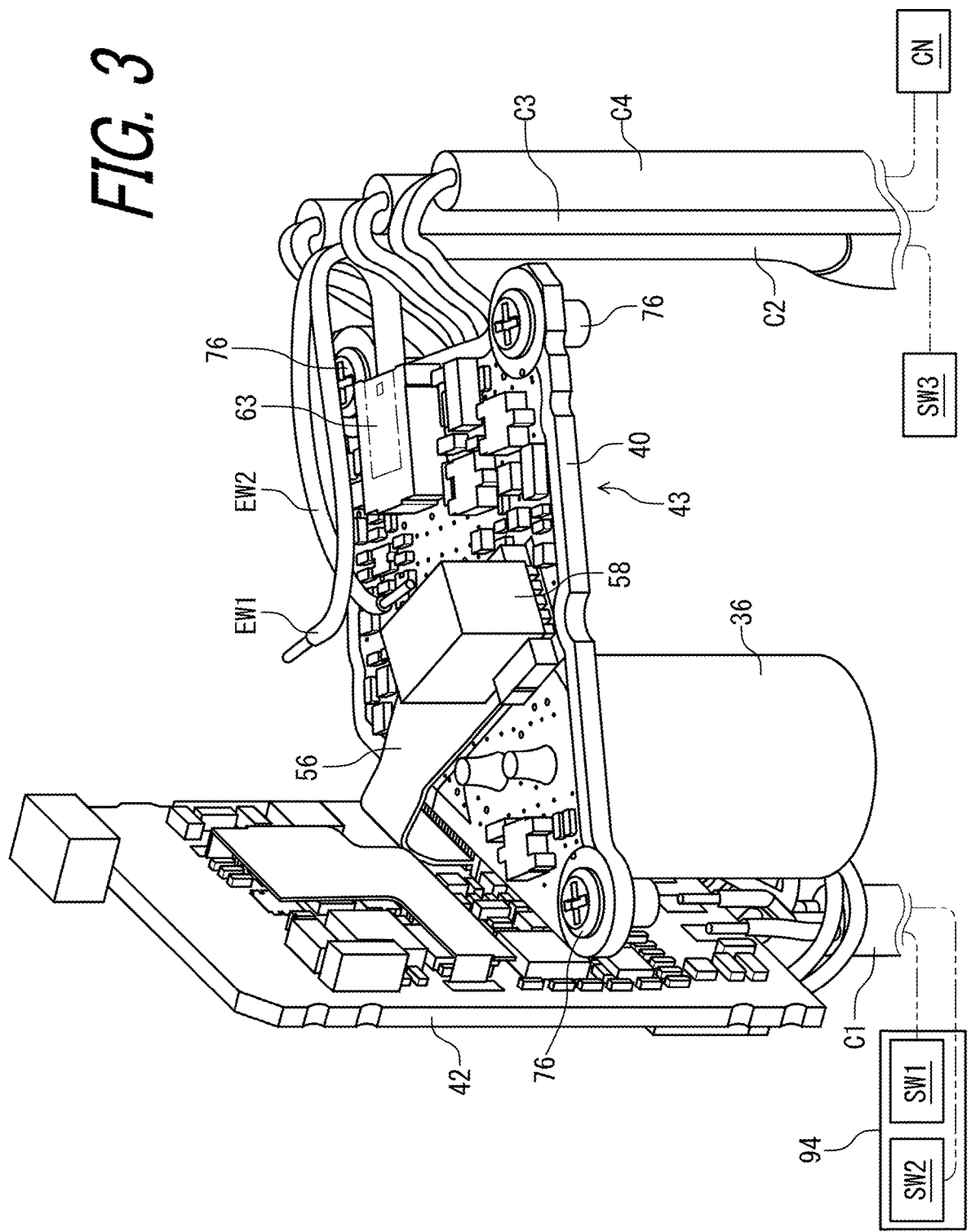
FIG. 3 is a perspective view of an internal structure of the operating device illustrated in FIG. 1.

As seen in FIG. 3, the operating device 10 further comprises a third substrate 56. The third substrate 56 is configured to electrically connect the first substrate 40 to the second substrate 42. The third substrate 56 is a different substrate from the first substrate 40 and the second substrate 42. In the present embodiment, the third substrate 56 includes a flexible member configured to electrically connect the first substrate 40 to the second substrate 42. The third substrate 56 includes a flexible printed circuit configured to electrically connect the first substrate 40 to the second substrate 42.

The operating device 10 further comprises a substrate support 58. The substrate support 58 is configured to support the third substrate 56 relative to at least one of the operating member 14, the base member 12, the first substrate 40 and the second substrate 42. The substrate support 58 is configured to support the third substrate 56 to reduce movement of the flexible substrate relative to at least one of the operating member 14, the base member 12, the first substrate 40 and the second substrate 42. In the present embodiment, the substrate support 58 is configured to support the third substrate 56 relative to the base member 12, the first substrate 40 and the second substrate 42. The substrate support 58 includes an elastic member. The elastic member is configured to reduce vibration of the flexible substrate. The substrate support 58 is made of an elastic material such as rubber. However, the substrate support 58 can include other materials other than the elastic member or the elastic material.

As seen in FIG. 2, the third substrate 56 and the substrate support 58 are provided in the additional accommodating space 53 of the additional accommodating structure 44. The substrate support 58 is provided between the third substrate 56 and the accommodating housing 48. The third substrate 56 and the substrate support 58 are provided in the first area AR1. However, at least one of the third substrate 56 and the substrate support 58 can be provided in the second area AR2 or outside the additional accommodating space 53.

Figure 4:
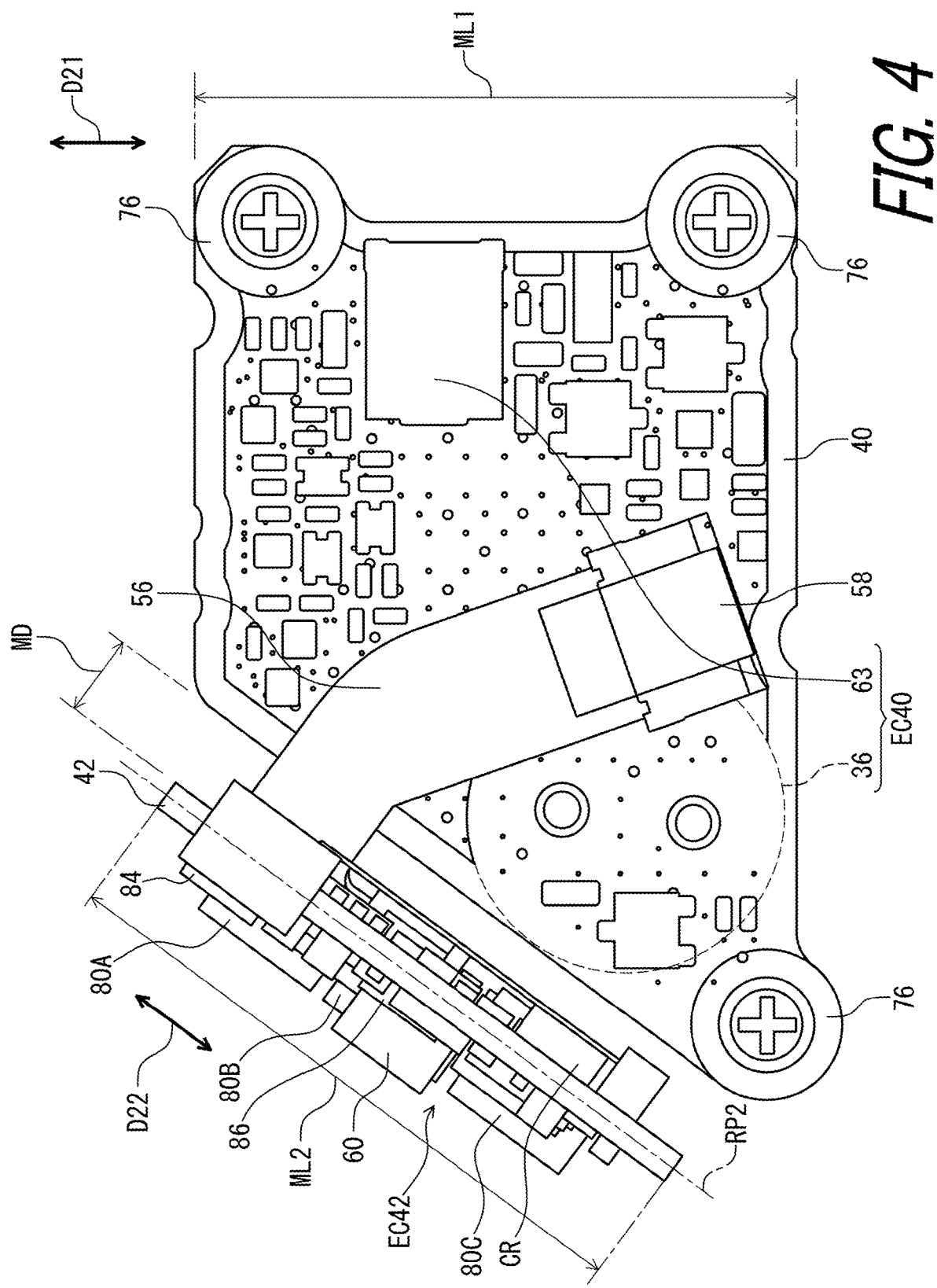
FIG. 4 is a plan view of the internal structure of the operating device illustrated in FIG. 1.

As seen in FIG. 4, the first substrate 40 is spaced apart from the second substrate 42. The first substrate 40 has a first minimum length ML1 defined in a first direction D21 along the first reference plane RP1. The second substrate 42 has a second minimum length ML2 defined in a second direction D22 along the second reference plane RP2. At least one of the first minimum length ML1 and the second minimum length ML2 is larger than a minimum distance MD defined between the first substrate 40 and the second substrate 42. In the present embodiment, the first minimum length ML1 and the second minimum length ML2 are larger than a minimum distance MD. The second minimum length ML2 is larger than the first minimum length ML1. However, at least one of the first minimum length ML1 and the second minimum length ML2 can be equal to or smaller than the minimum distance MD. The second minimum length ML2 can be equal to or smaller than the first minimum length ML1.

The operating device 10 comprises a wireless communicator 60. The wireless communicator 60 is configured to wirelessly communicate with another wireless communicator. In the present embodiment, the wireless communicator 60 is electrically mounted on the second substrate 42. However, the wireless communicator 60 can be electrically mounted on the first substrate 40 or other substrates.

The second electric power source 36 is electrically connected so as to supply electricity to the wireless communicator 60. The second electric power source 36 is electrically connected so as to supply electricity to the wireless communicator 60 through the first substrate 40, the third substrate 56, and the second substrate 42. The first electric power source 34 can be configured to charge the second electric power source 36. The first electric power source 34 can be configured to supply electricity to the second electric power source 36 and the wireless communicator 60 at a predetermined ratio between the second electric power source 36 and the wireless communicator 60.

Figure 5:
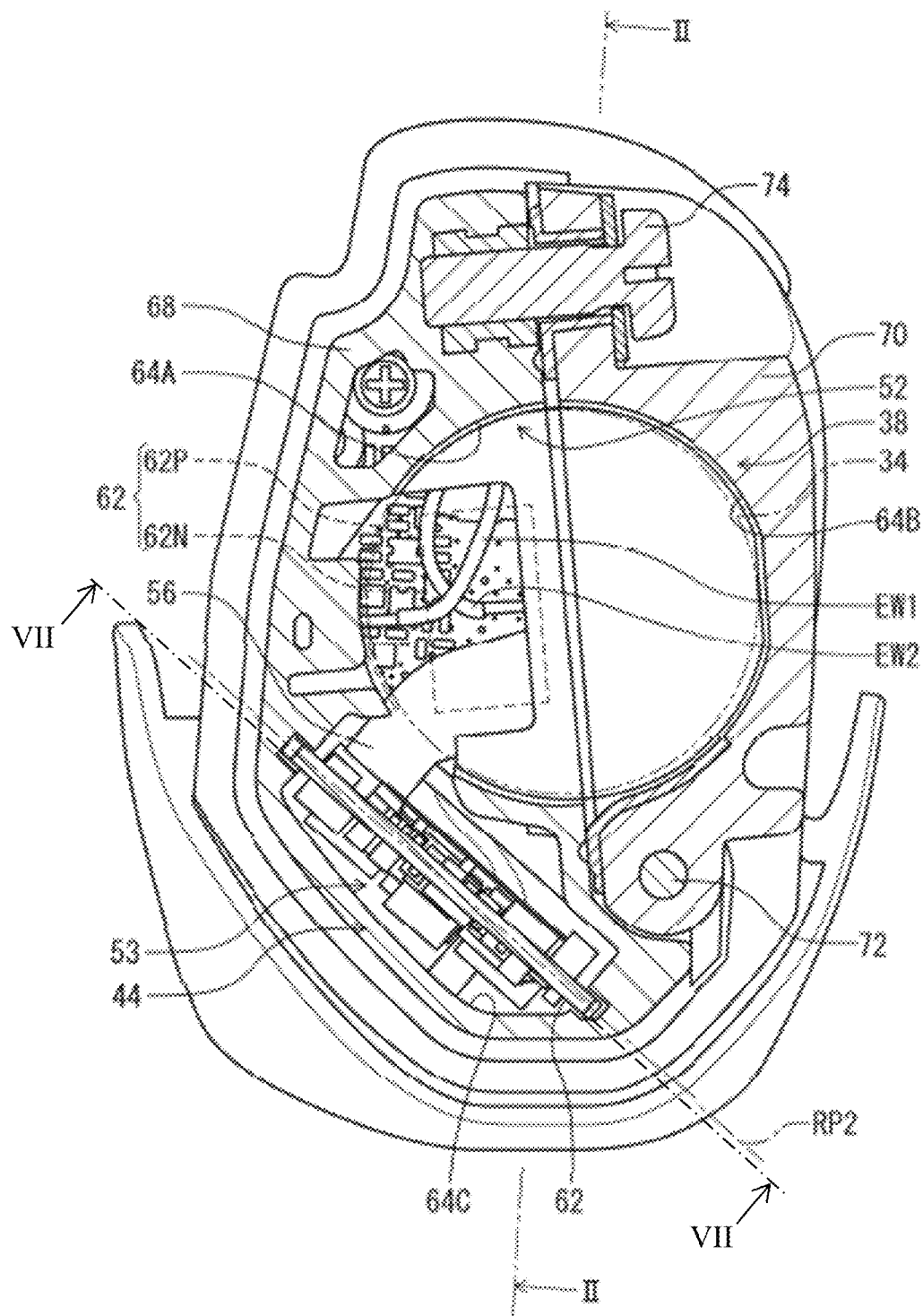
FIG. 5 is a cross-sectional view of the operating device illustrated in FIG. 1 taken along line V-V in FIG. 2.

As seen in FIG. 5, the accommodating structure 38 includes an electrical contact 62. The electrical contact 62 is configured to be in contact with the first electric power source 34 in an accommodation state where the accommodating structure 38 accommodates the first electric power source 34. The electrical contact 62 includes a positive contact 62P and a negative contact 62N separated from the positive contact 62P. The electrical contact 62 is provided in the accommodating space 52 of the accommodating structure 38. The positive contact 62P and the negative contact 62N are provided in the accommodating space 52 of the accommodating structure 38. The positive contact 62P is electrically connected to a first electric wire EW1. The negative contact 62N is electrically connected to a second electric wire EW2.

As seen in FIG. 3, the first electric wire EW1 and the second electric wire EW2 are electrically connected to the first substrate 40. Thus, the second electric power source 36 is configured to be electrically connected to the electrical contact 62. The second electric power source 36 is configured to be electrically connected to the positive contact 62P and the negative contact 62N. The second electric power source 36 is configured to be electrically connected to the electrical contact 62 through the first substrate 40, the first electric wire EW1, and the second electric wire EW2. The second electric power source 36 is configured to be electrically connected to the positive contact 62P through the first substrate 40 and the first electric wire EW1. The second electric power source 36 is configured to be electrically connected to the negative contact 62N through the first substrate 40 and the second electric wire EW2.

The operating device 10 comprises a voltage controller 63. The voltage controller 63 is electrically mounted on the first substrate 40. The voltage controller 63 is configured to be electrically connected to the first electric power source 34 through the first electric wire EW1, the second electric wire EW2, and the electrical contact 62. The voltage controller 63 is configured to be electrically connected to the second electric power source 36 through the first substrate 40. The voltage controller 63 is configured to control charging power from the first electric power source 34 (see, e.g., FIG. 5) to the second electric power source 36. For example, the second electric power source 36 is configured to supplement electricity supplied from the first electric power source 34 to electric components such as the wireless communicator 60 (see, e.g., FIG. 4). The voltage controller 63 is configured to control power supply from the first electric power source 34 and the second electric power source 36 to electric components such as the wireless communicator 60.

The switches SW1 and SW2 are electrically connected to the second substrate 42 through an electric cables C1. The switch SW3 is electrically connected to the first substrate 40 through an electric cable C2. The connector CN is electrically connected to the first substrate 40 through electric cables C3 and C4.

Figure 6:
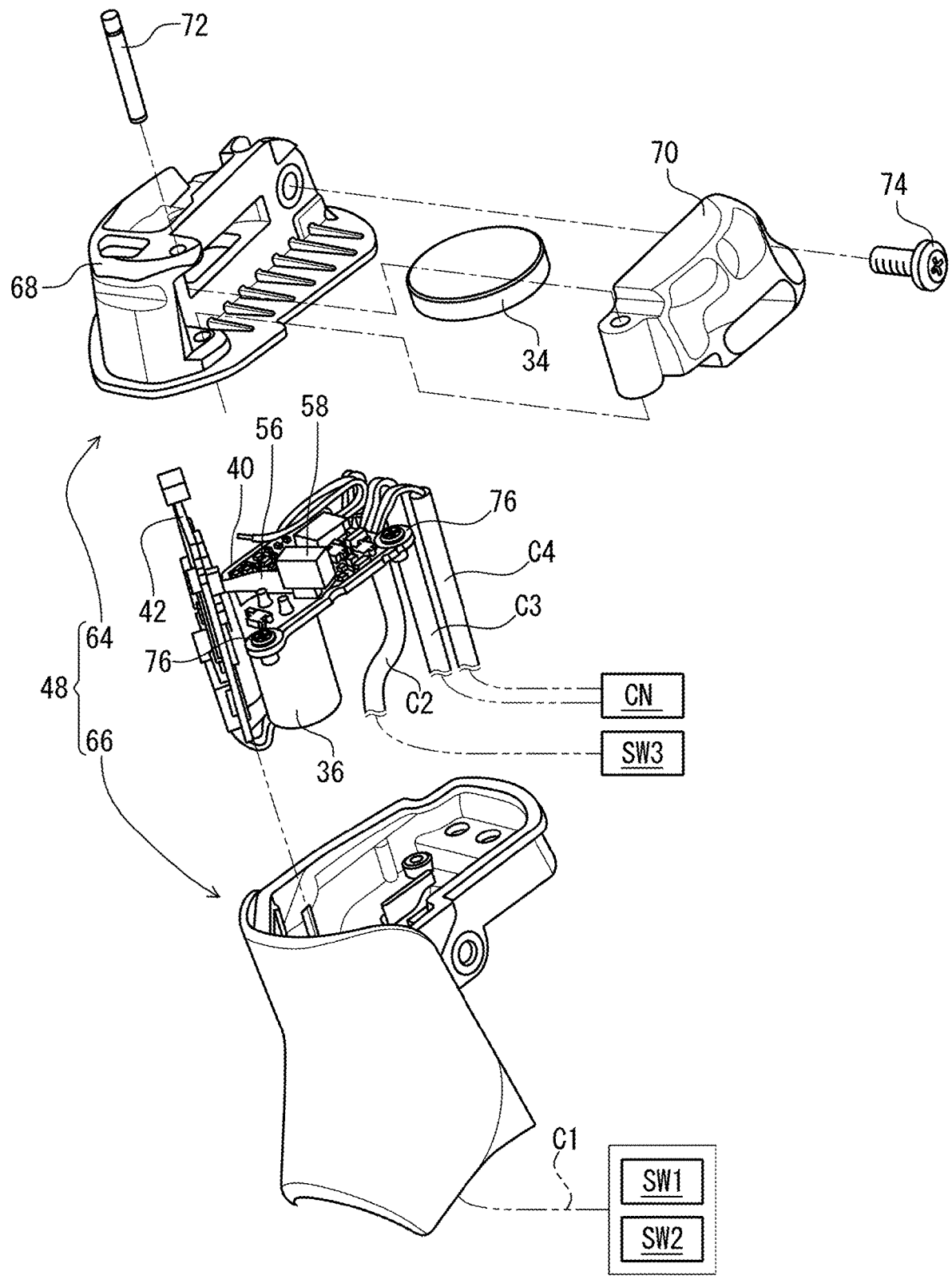
FIG. 6 is an exploded perspective view of an accommodating housing of the operating device illustrated in FIG. 1.

As seen in FIG. 6, the accommodating housing 48 includes a first housing 64 and a second housing 66. The second housing 66 is configured to be attached to the first housing 64. The accommodating structure 38 is provided to at least one of the first housing 64 and the second housing 66 so as to accommodate the first electric power source 34. The additional accommodating structure 44 is provided to at least one of the first housing 64 and the second housing 66 so as to accommodate the second electric power source 36. In the present embodiment, the accommodating structure 38 is provided to the first housing 64. The additional accommodating structure 44 is provided to the first housing 64 and the second housing 66. However, the accommodating structure 38 can be provided to the second housing 66 or both the first housing 64 and the second housing 66. The additional accommodating structure 44 can be provided to only one of the first housing 64 and the second housing 66.

The second housing 66 is a separate member from the first housing 64. Each of the first housing 64 and the second housing 66 is made of a non-metallic material such as a fiber-reinforced plastic. However, the material of the first housing 64 and the second housing 66 is not limited to this embodiment.

The first housing 64 includes a housing body 68, a lid 70, a pivot pin 72, and a fastener 74. The lid 70 is pivotally coupled to the housing body 68 through the pivot pin 72. The fastener 74 is configured to fasten the lid 70 to the housing body 68.

As seen in FIG. 5, the first housing 64 includes a first recess 64A and a first additional recess 64B. The housing body 68 includes the first recess 64A. The lid 70 includes the first additional recess 64B. The first recess 64A and the first additional recess 64B at least partly constitute the accommodating space 52.

As seen in FIG. 2, the second housing 66 includes a second recess 66A. The first housing 64 includes a second additional recess 64C. The second recess 66A and the second additional recess 64C at least partly constitute the additional accommodating space 53. The structure of the accommodating housing 48 is not limited to the illustrated structure.

In the present embodiment, the operating device 10 is a right-hand side operating/control device configured to be operated by the rider's right hand to actuate the operated device BC1, the electric component BC2, and/or an additional electric component BC3. However, the structures of the operating device 10 can be applied to a left-hand side operating device. For example, the operating device 10 and the left-hand side operating device can be symmetric with respect to a transverse center plane of a vehicle body of the human-powered vehicle 2 in a state where the operating device 10 and the left-hand side operating device are mounted to the vehicle body of the human-powered vehicle 2.

Figure 7:
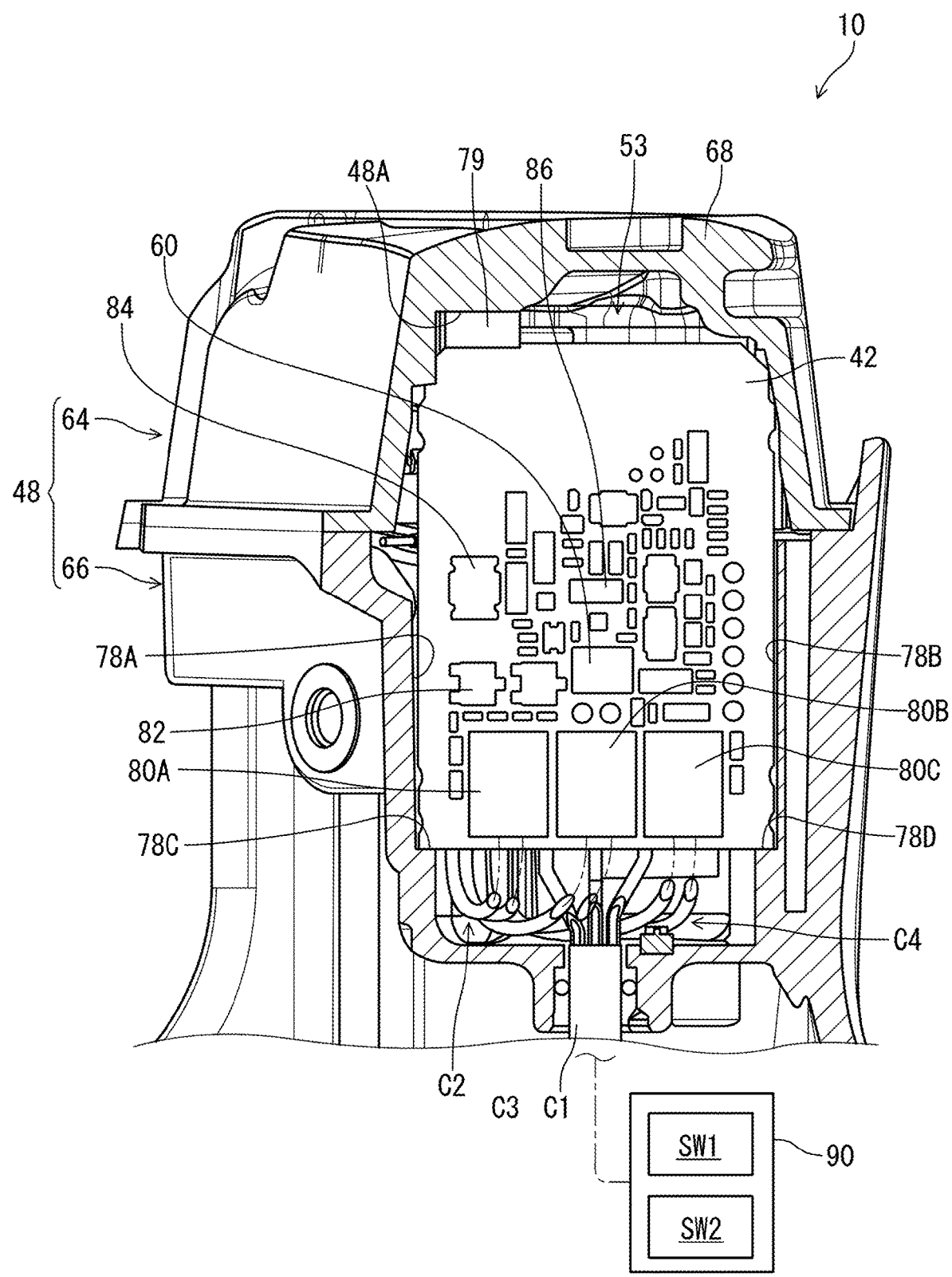
FIG. 7 is a cross-sectional view of the operating device illustrated in FIG. 1 taken along line VII-VII in FIG. 5.

As seen in FIG. 6, the first substrate 40 is detachably attached to the accommodating housing 48 with substrate fasteners 76 such as screws. As seen in FIG. 5, the accommodating housing 48 includes a first attachment groove 78A and a second attachment groove 78B. The second substrate 42 is removably provided in the first attachment groove 78A and the second attachment groove 78B. As seen in FIG. 7, an elastic body 79 is provided between an inner surface 48A of the accommodating housing 48 and the second substrate 42. The first attachment groove 78A includes a first end surface 78C. The second attachment groove 78B includes a second end surface 78D. The second substrate 42 is held between the elastic body 79 and each of the first end surface 78C and the second end surface 78D.

As seen in FIG. 7, the operating device 10 comprises a first connection part 80A, a second connection part 80B, and a third connection part 80C. The first connection part 80A, the second connection part 80B, and the third connection part 80C are electrically mounted on the second substrate 42. The first connection part 80A is electrically connected to the electric cable C2. The second connection part 80B is electrically connected to the electric cable C3. The third connection part 80C is electrically connected to the electric cable C4. The first connection part 80A is electrically connected to the switch SW3 (see, e.g., FIG. 6) via the electric cable C2. The second connection part 80B is electrically connected to the connector CN (see, e.g., FIG. 6) via the electric cable C3. The third connection part 80C is electrically connected to the connector CN (see, e.g., FIG. 6) via the electric cable C4.

Figure 8:
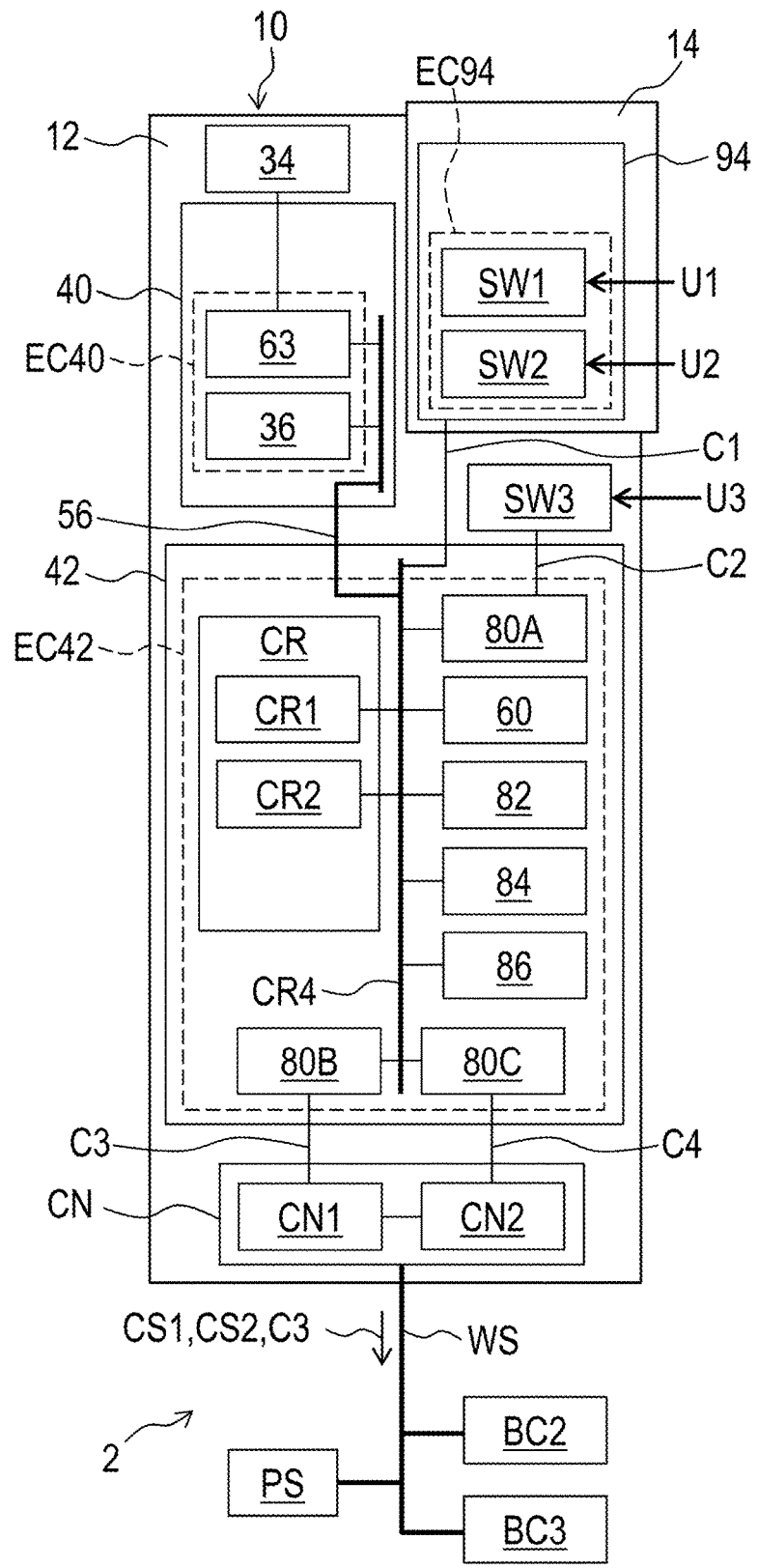
FIG. 8 is a block diagram of the operating device illustrated in FIG. 1.

As seen in FIG. 8, the connector CN includes connection a first connection port CN1 and a second connection port CN2. The first connection port CN1 is configured to detachably receive an electric control cable of an electric wiring structure WS. The second connection port CN2 is configured to detachably receive an electric control cable of the electric wiring structure WS. The second connection part 80B is electrically connected to the first connection port CN1 via the electric cable C3. The third connection part 80C is electrically connected to the second connection port CN2 via the electric cable C4. A total number of the connection ports of the connector CN is not limited to this embodiment. The connector CN can include one connection port or at least three connection ports.

The operating device 10 comprises a controller CR. The controller CR is configured to control components of the operating device 10 and/or another device in response to user inputs U1, U2, and U3 received by the switches SW1, SW2, and SW3.

The operating device 10 comprises a wired communicator 82. The wired communicator 82 is configured to communicate with a wired communicator of the electric component BC2 via a wired communication channel. The controller CR is configured to control the wired communicator 82 and the wireless communicator 60 to transmit a control signal CS1 and/or CS2 to the electric component BC2. The controller CR is configured to control the wired communicator 82 and the wireless communicator 60 to transmit a control signal CS3 to the additional electric component BC3.

In the present embodiment, for example, the control signal CS1 indicates upshifting of the electric component BC2. The control signal CS2 indicates downshifting of the electric component BC2. The control signal CS3 indicates that the state of the additional electric component BC3 is changed between the lock state and the adjustable state. However, the control signals CS1, CS2, and CS3 are not limited to the above control commands.

The controller CR includes a processor CR1, a memory CR2, and a system bus CR4. The processor CR1 and the memory CR2 are electrically mounted on the second substrate 42. The processor CR1 includes a central processing unit (CPU) and a memory controller. The processor CR1 is electrically connected to the memory CR2 with the second substrate 42 and the system bus CR4. Each of the wired communicator 82 and the wireless communicator 60 is electrically connected to the processor CR1 and the memory CR2 with the second substrate 42 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the controller CR, the wireless communicator 60, and the wired communicator 82 is performed.

Figure 9:
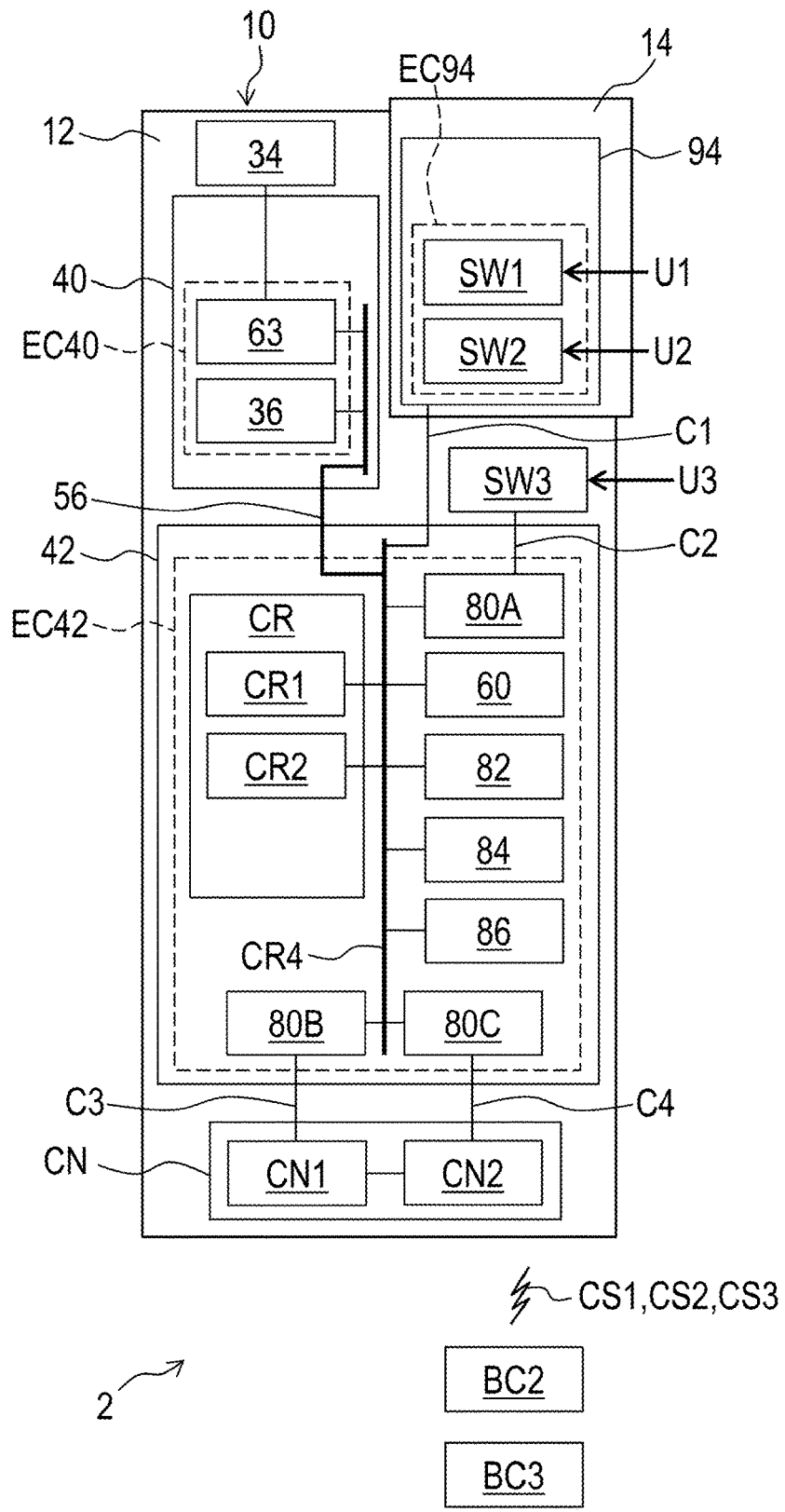
FIG. 9 is a block diagram of the operating device illustrated in FIG. 1.

As seen in FIGS. 8 and 9, the controller CR is configured to select one of the wired communicator 82 and the wireless communicator 60. In the present embodiment, the controller CR is configured to select the wireless communicator 60 as a default communicator. The controller CR is configured to detect connection between the connector CN and an electric control cable of the electric wiring structure WS (see, e.g., FIG. 8). The connector CN is electrically connected to the controller CR. The controller CR is configured to detect electricity supplied from an external electric power source PS (see, e.g., FIG. 8) to the connector CN. The controller CR is configured to select the wireless communicator 60 if the electric wiring structure WS (see, e.g., FIG. 8) is not connected to the connector CN. The controller CR is configured to select the wired communicator 82 if the electric wiring structure WS (see, e.g., FIG. 8) is connected to the connector CN. However, the controller CR can be configured to select the wired communicator 82 as a default communicator.

As seen in FIG. 8, in the present embodiment, the wired communication channel is established using power line communication (PLC) technology. More specifically, the electric wiring structure WS includes a ground line and a voltage line. The PLC technology is used for communicating between electric components. The PLC carries data on a conductor that is also used simultaneously for electric power transmission or electric power distribution to the electric components.

The PLC uses unique device identification (ID) that is assigned to an electric component such as the operating device 10. In the present embodiment, the memory CR2 is configured to store device information including unique device ID assigned to the operating device 10. Based on the unique device ID, the controller CR is configured to recognize signals which are necessary for itself among signals transmitted via the wired communication channel. For example, the controller CR is configured to generate signals including the device information indicating the operating device 10.

The controller CR is configured to recognize signals including other device information as signals transmitted from the electric component BC2 via the wired communication channel. The wired communicator 82 is configured to separate input signals to a power source voltage and signals including device information. The wired communicator 82 is configured to regulate the power source voltage to a level at which the operating device 10 can properly operate. The wired communicator 82 is further configured to superimpose output signals such as signals including the device information on the power source voltage applied to the electric wiring structure WS from the external electric power source PS.

The wireless communicator 60 includes a signal transmitting circuit and a signal receiving circuit. The wireless communicator 60 is configured to superimpose digital signals on carrier wave using a predetermined wireless communication protocol to wirelessly transmit the digital signal. In the present embodiment, the wireless communicator 60 is configured to encrypt signals using a cryptographic key to generate encrypted wireless signals.

The wireless communicator 60 is configured to receive and/or transmit a wireless signal via the antenna 84. In the present embodiment, the wireless communicator 60 is configured to decode the wireless signal to recognize signals and/or information wirelessly transmitted from another wireless communicator. The wireless communicator 60 is configured to decrypt the wireless signal using the cryptographic key. The wireless communicator 60 can also be referred to as a wireless communication circuit or circuitry 60.

The controller CR is configured to generate the control signal CS1 in response to the user input U1. The controller CR is configured to generate the control signal CS2 in response to the user input U2. The controller CR is configured to generate the control signal CS3 in response to the user input U3. The controller CR is configured to control the wired communicator 82 to respectively transmit the control signals CS1, CS2, and CS3 via the wired communication channel in response to the user inputs U1, U2, and U3 if the controller CR selects the wired communicator 82. The controller CR is configured to control the wireless communicator 60 to respectively transmit the control signals CS1, CS2, and CS3 via a wireless communication channel in response to the user inputs U1, U2, and U3 if the controller CR selects the wireless communicator 60.

The operating device 10 comprises an antenna 84 and an informing unit 86. The wireless communicator 60, the wired communicator 82, the antenna 84, the informing unit 86, and the controller CR are electrically mounted on the second substrate 42. The wireless communicator 60, the wired communicator 82, the antenna 84, the informing unit 86, and the controller CR are electrically connected with each other via the first substrate 40.

The wireless communicator 60 is configured to communicate with a wireless communicator of the electric component BC2 using the antenna 84 via the wireless communication channel. The wireless communicator 60 is configured to communicate with a wireless communicator of the additional electric component BC3 using the antenna 84 via the wireless communication channel.

The informing unit 86 is configured to inform the user of information relating to the operating device 10 and/or another device (e.g., the electric components BC2 and/or BC3). Examples of the information relating to the operating device 10 includes a communication state of the wireless communicator 60, a communication state of the wired communicator 82, a level of remaining electricity of the first electric power source 34, a level of remaining electricity of the second electric power source 36, and a pairing state of the wireless communicator 60. In the present embodiment, the informing unit 86 includes a light emitting device such as a light-emitting diode (LED). However, the informing unit 86 can include other structures such as a vibrator or a loudspeaker.

Figure 10:
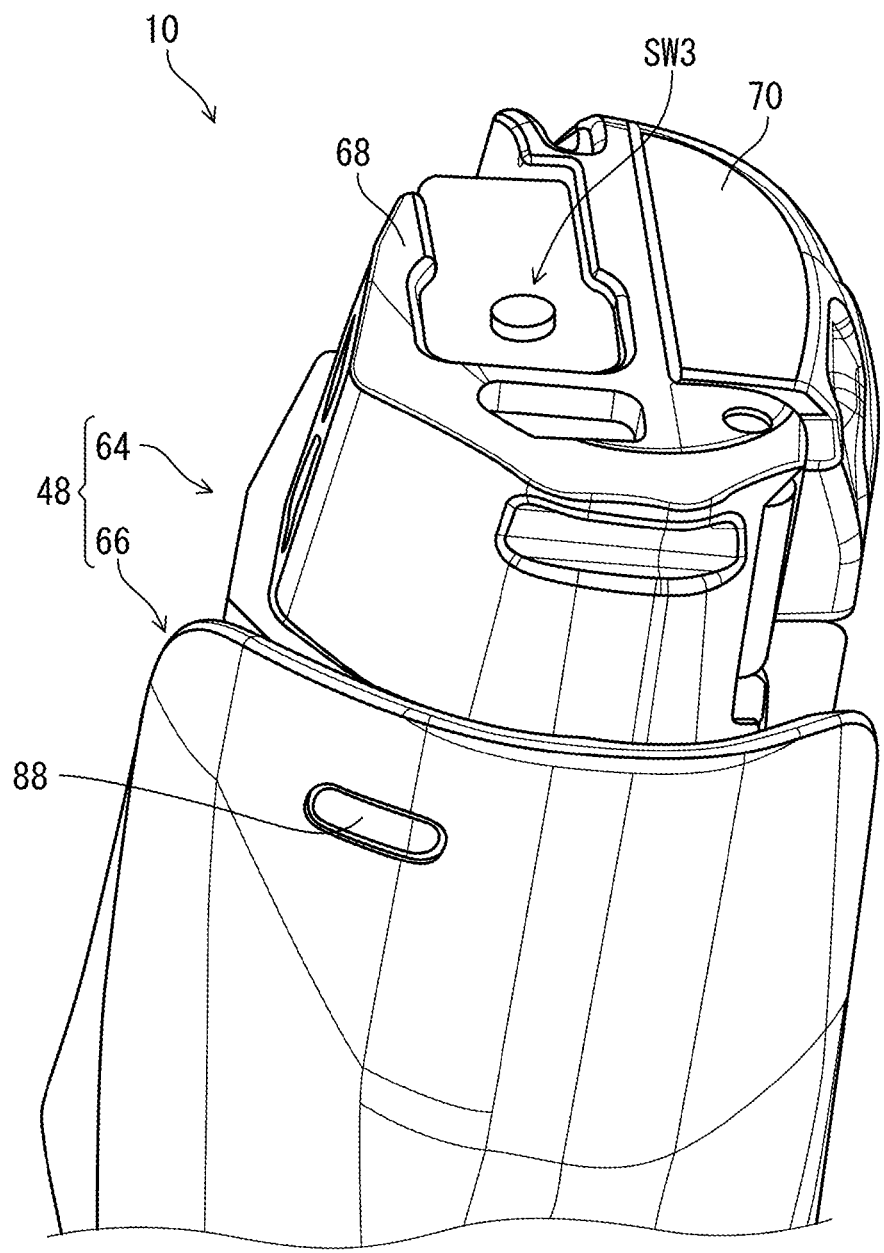
FIG. 10 is a front view of the operating device illustrated in FIG. 1.

As seen in FIG. 10, the light emitted from the informing unit 86 is transmitted to the outside of the operating device 10 via a light transmitting part 88. However, the position of the light transmitting part 88 is not limited to the position depicted in FIG. 10.

As seen in FIG. 4, the operating device 10 further comprises at least one first electric component EC40 and at least one second electric component EC42. The at least one first electric component EC40 is electrically mounted on the first substrate 40. The at least one second electric component EC42 is electrically mounted on the second substrate 42. In the present embodiment, the operating device 10 further comprises a plurality of first electric components EC40 electrically mounted on the first substrate 40. The operating device 10 further comprises a plurality of second electric components EC42 electrically mounted on the second substrate 42. However, the total number of the first electric components EC40 is not limited to the total number disclosed in the present embodiment. The total number of the second electric components EC42 is not limited to the total number disclosed in the present embodiment.

The at least one second electric component EC42 includes at least one of the controller CR and the electric power source 36. The at least one second electric component EC42 includes at least one of the controller CR, the electric power source 36, and the wireless communicator 60. In the present embodiment, the at least one second electric component EC42 includes the controller CR, the wireless communicator 60, the wired communicator 82, the antenna 84, the informing unit 86, the first connection part 80A, the second connection part 80B, and the third connection part 80C. The at least one first electric component EC40 includes the electric power source 36 and the voltage controller 63. However, the at least one second electric component EC42 can include at least one of the electric power source 36 and the voltage controller 63. The at least one first electric component EC40 can include at least one of the controller CR, the wireless communicator 60, the wired communicator 82, the antenna 84, and the informing unit 86.

A first total number of the at least one first electric component EC40 is different from a second total number of the at least one second electric component EC42. In the present embodiment, the second total number of the at least one second electric component EC42 is larger than the first total number of the at least one first electric component EC40. However, the second total number can be equal to or smaller than the first total number.

In the present embodiment, the first total number of the at least one first electric component EC40 is two. The second total number of the at least one second electric component EC42 is eight. The first total number of the at least one first electric component EC40 is not limited to the above total number. The second total number of the at least one second electric component EC42 is not limited to the above total number.

Figure 11:
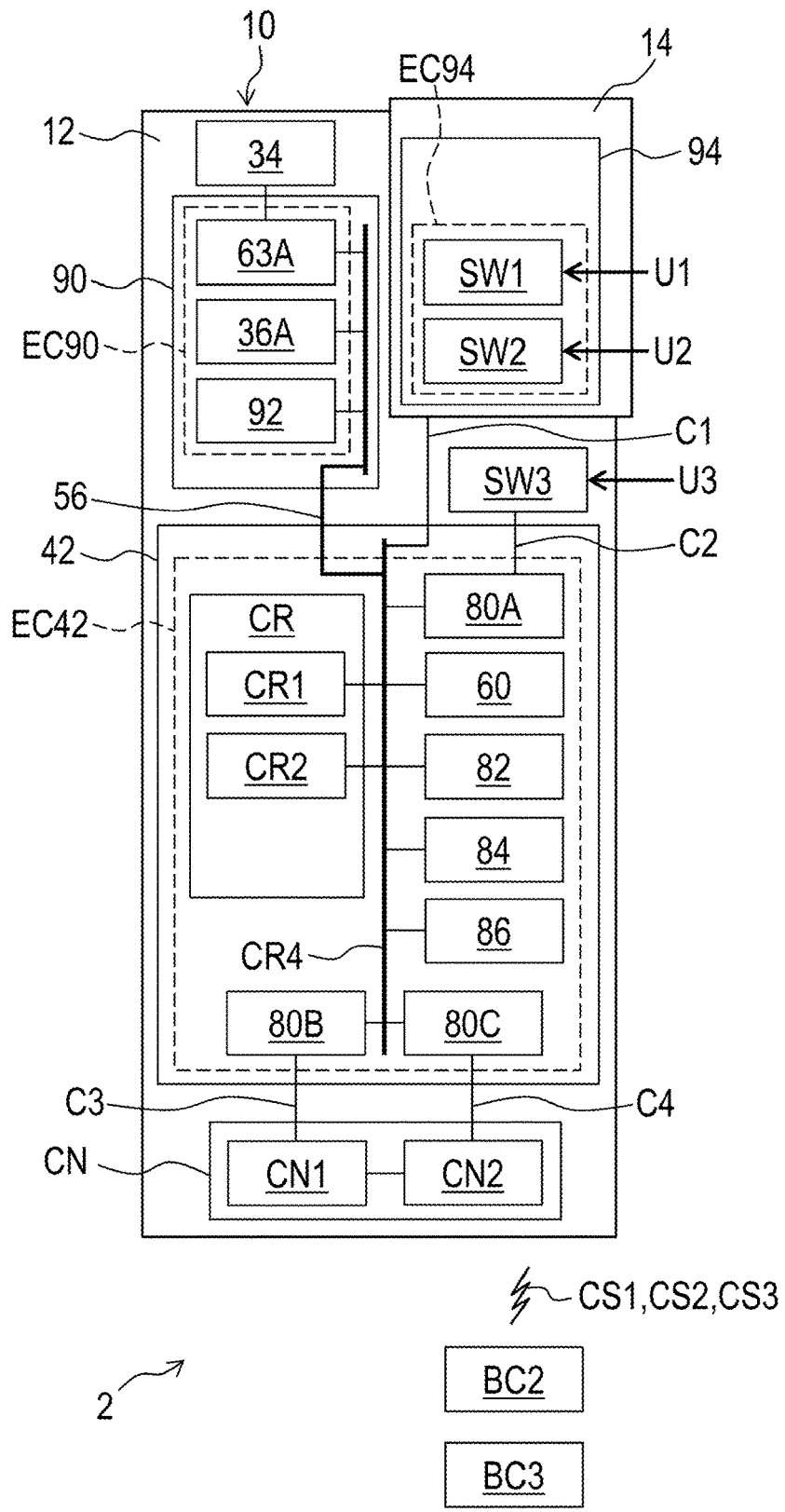
FIG. 11 is a block diagram of the operating device illustrated in FIG. 1, with an additional substrate with which a first substrate is replaced.

As seen in FIGS. 9 and 11, at least one of the first substrate 40 and the second substrate 42 is replaceable with an additional substrate 90. In the present embodiment, the first substrate 40 is replaceable with the additional substrate 90. The additional substrate 90 is attachable to the accommodating housing 48 using the plurality of fasteners 76 (see, e.g., FIG. 6) instead of the first substrate 40. However, the second substrate 42 can be replaceable with another substrate.

At least one third electric component EC90 is electrically mounted on the additional substrate 90. The at least one third electric component EC90 has a third total number different from at least one of the first total number and the second total number. In the present embodiment, the third total number is different from the first total number of the at least one first electric component EC40 and the second total number of the at least one second electric component EC42. The second total number of the at least one second electric component EC42 is larger than third total number. The third total number is larger than the first total number of the at least one first electric component EC40. However, the relationship between the first total number, the second total number, and the third total number is not limited to the above relationship.

The at least one third electric component EC90 includes an electric power source 36A, a voltage controller 63A, and an additional electric component 92. The electric power source 36A has substantially the same structure as the structure of the electric power source 36. The voltage controller 63A has substantially the same structure as the structure of the voltage controller 63. The additional electric component 92 has a structure different from the structures of the electric power source 36A and the voltage controller 63A. Examples of the additional electric component 92 include a controller, a wireless communicator, a wired communicator, an antenna, an informing unit, a switch, or other electric components. However, the additional electric component 92 can have substantially the same structure as the structure of the electric power source 36A or the voltage controller 63A.

Figure 12:
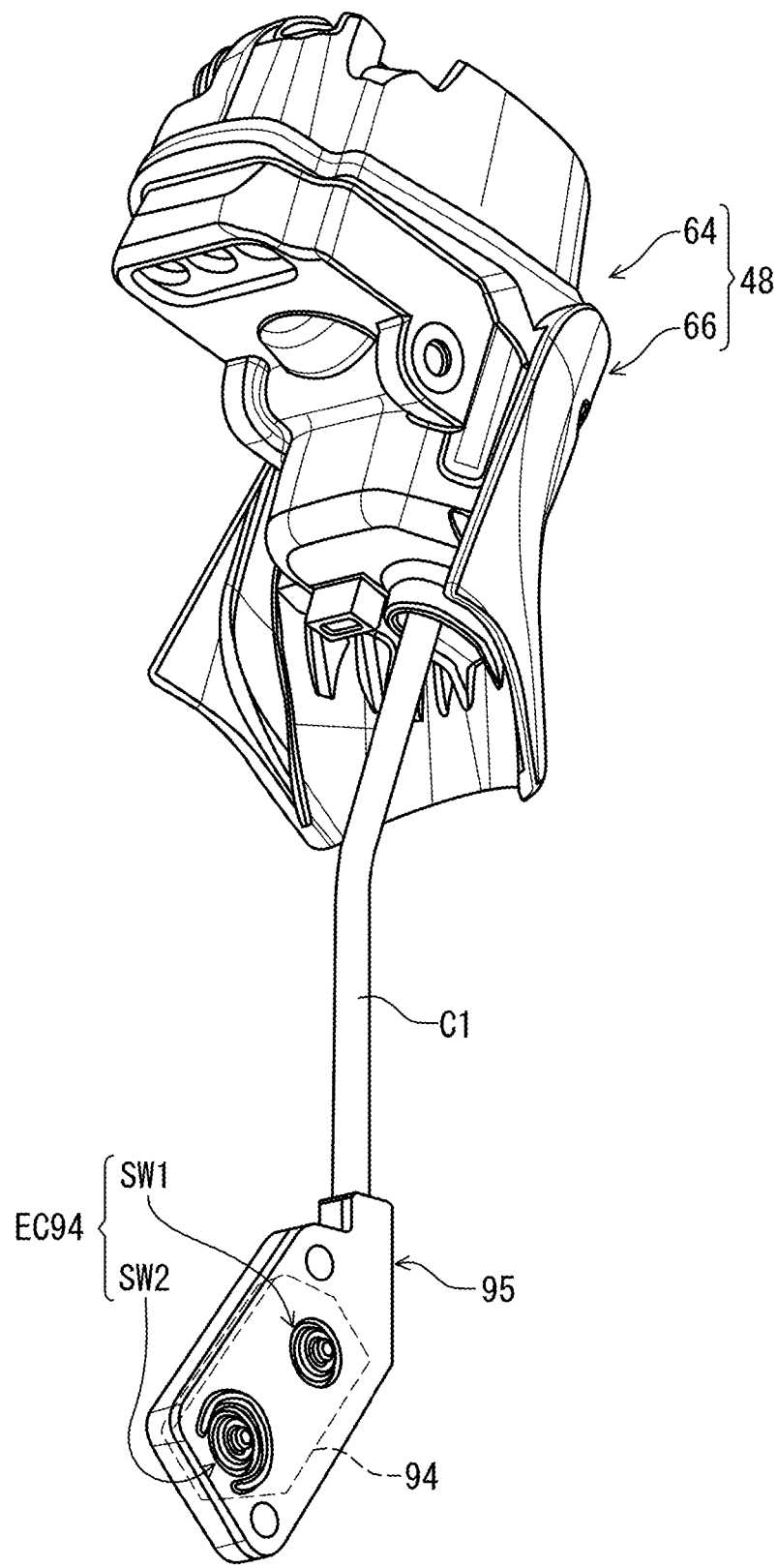
FIG. 12 is an exploded perspective view of the operating device illustrated in FIG. 1.

As seen in FIG. 12, the operating device 10 for the human-powered vehicle 2 comprises a first substrate 94. The first substrate 94 is provided to one of the base member 12 and the operating member 14. In the second embodiment, the first substrate 94 is provided to the operating member 14 (see, e.g., FIG. 1). The operating device 10 comprises a case 95. The case 95 is secured to the operating member 14 (see, e.g., FIG. 1). The first substrate 94 is provided in the case 95. The first substrate 94 is detachably attached to the case 95 with fasteners such as screws. As seen in FIG. 6, the first substrate 94 is separate from the first substrate 40 and the second substrate 42.

As seen in FIG. 12, the operating device 10 further comprises at least one first electric component EC94 electrically mounted on the first substrate 94. In the present embodiment, the operating device 10 further comprises a plurality of second electric components EC42 electrically mounted on the second substrate 42 (see, e.g., FIG. 13). However, the total number of the second electric components EC42 is not limited to the total number disclosed in the present embodiment.

The at least one first electric component EC94 includes a switch electrically mounted on the first substrate 94. In the present embodiment, the at least one first electric component EC94 includes the switches SW1 and SW2. The switches SW1 and SW2 are electrically mounted on the first substrate 94. However, the at least one first electric component EC94 can include other electric components instead of or in addition to the switches SW1 and SW2.

As seen in FIG. 9, a first total number of the at least one first electric component EC94 is different from the second total number of the at least one second electric component EC42. In the present embodiment, the second total number of the at least one second electric component EC42 is larger than the first total number of the at least one first electric component EC94. However, the first total number can be smaller than the second total number.

In the present embodiment, the first total number of the at least one first electric component EC94 is two. The second total number of the at least one second electric component EC42 is eight. The first total number of the at least one first electric component EC94 is not limited to the above total number.

Figure 13:
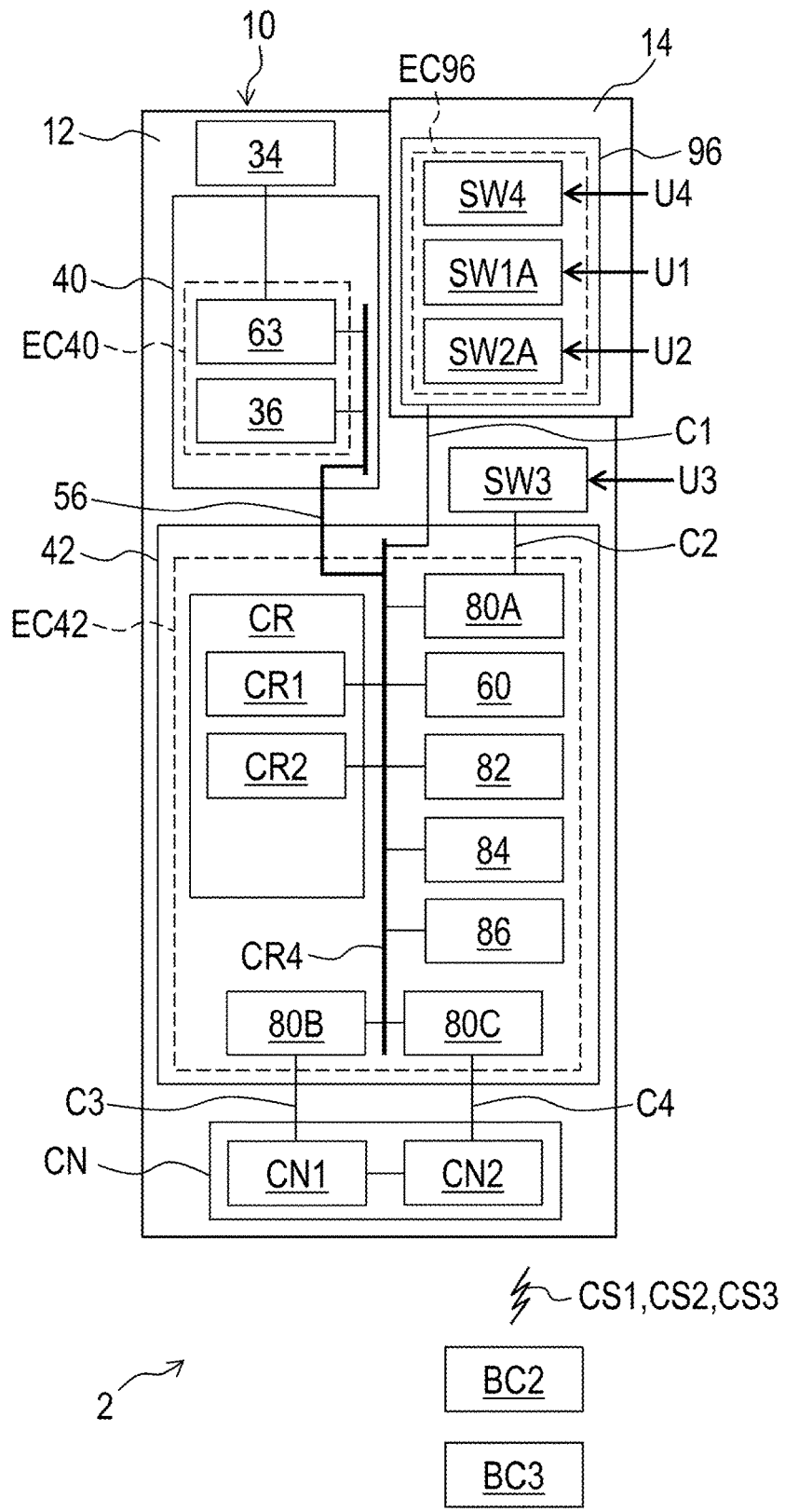
FIG. 13 is a block diagram of the operating device illustrated in FIG. 1, with an additional substrate with which a first substrate is replaced.

As seen in FIGS. 9 and 13, at least one of the first substrate 94 and the second substrate 42 is replaceable with an additional substrate 96. In the present embodiment, the first substrate 94 is replaceable with the additional substrate 96. The additional substrate 96 is attachable to the case 95 (see, e.g., FIG. 12) using the fasteners instead of the first substrate 94.

At least one third electric component EC96 is electrically mounted on the additional substrate 96. The at least one third electric component EC96 has a third total number different from at least one of the first total number and the second total number. In the present embodiment, the third total number is different from the first total number of the at least one first electric component EC94 and the second total number of the at least one second electric component EC42. The second total number of the at least one second electric component EC42 is larger than third total number. The third total number is larger than the first total number of the at least one first electric component EC94. However, the relationship between the first total number, the second total number, and the third total number is not limited to the above relationship.

The at least one third electric component EC96 includes switches SW1A, SW2A, and SW4. The switch SW1A has substantially the same structure as the switch SW1. The switch SW2A has substantially the same structure as the switch SW2. The switch SW4 has substantially the same structure as the switch SW1 or SW2. The switch SW4 is configured to receive a user input U4. Examples of the switches SW1A, SW2A, and SW4 include a push-button switch, a tactile switch, a toggle switch, a dial switch, and a slide switch. However, the switch SW4 can have a structure different from the structures of the switches SW1A and SW2A. The at least one third electric component EC96 can include other electric components other than switches.

Modifications

Figure 14:
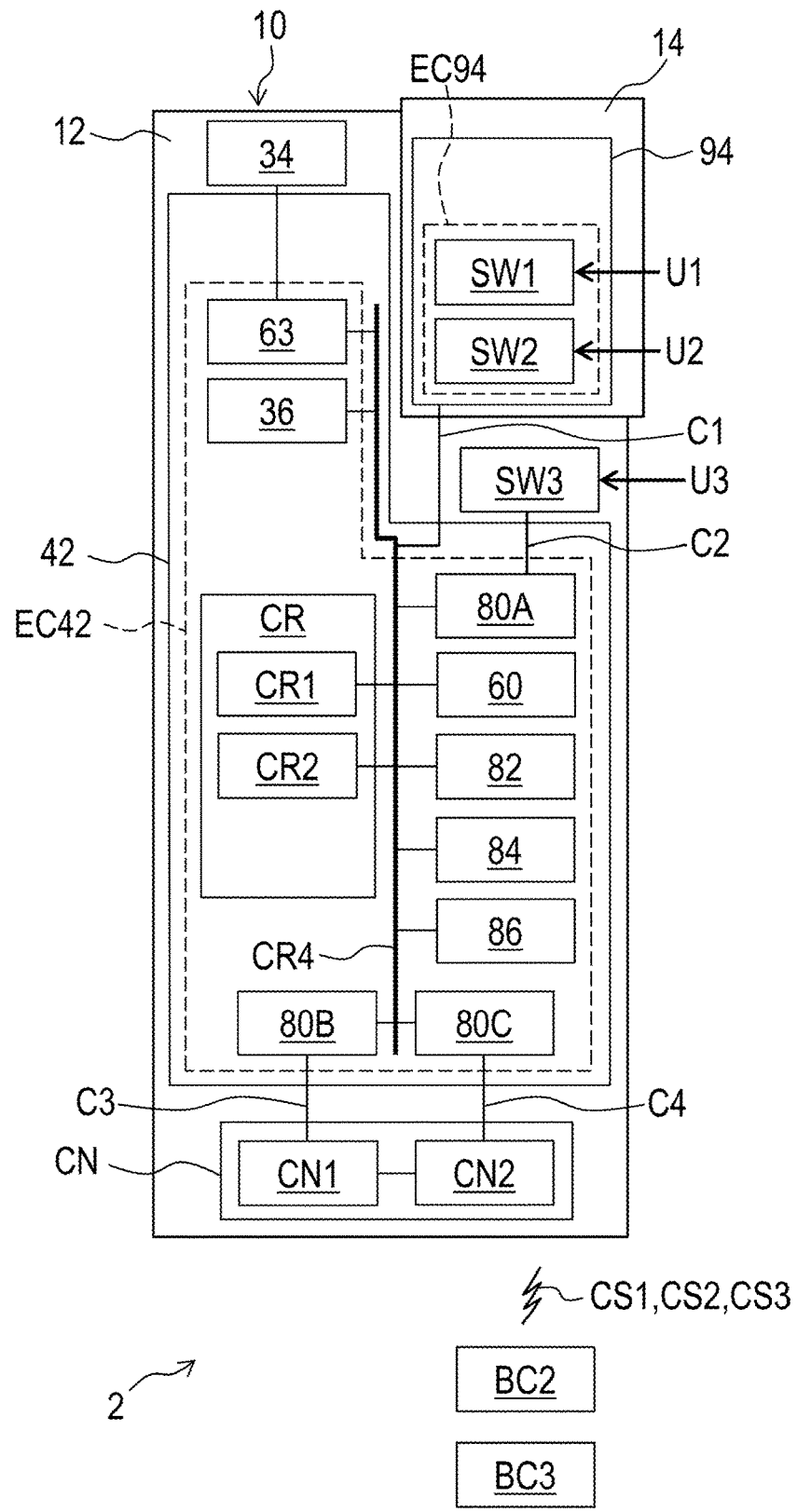
FIG. 14 is a block diagram of the operating device in accordance with a modification.
Figure 15:
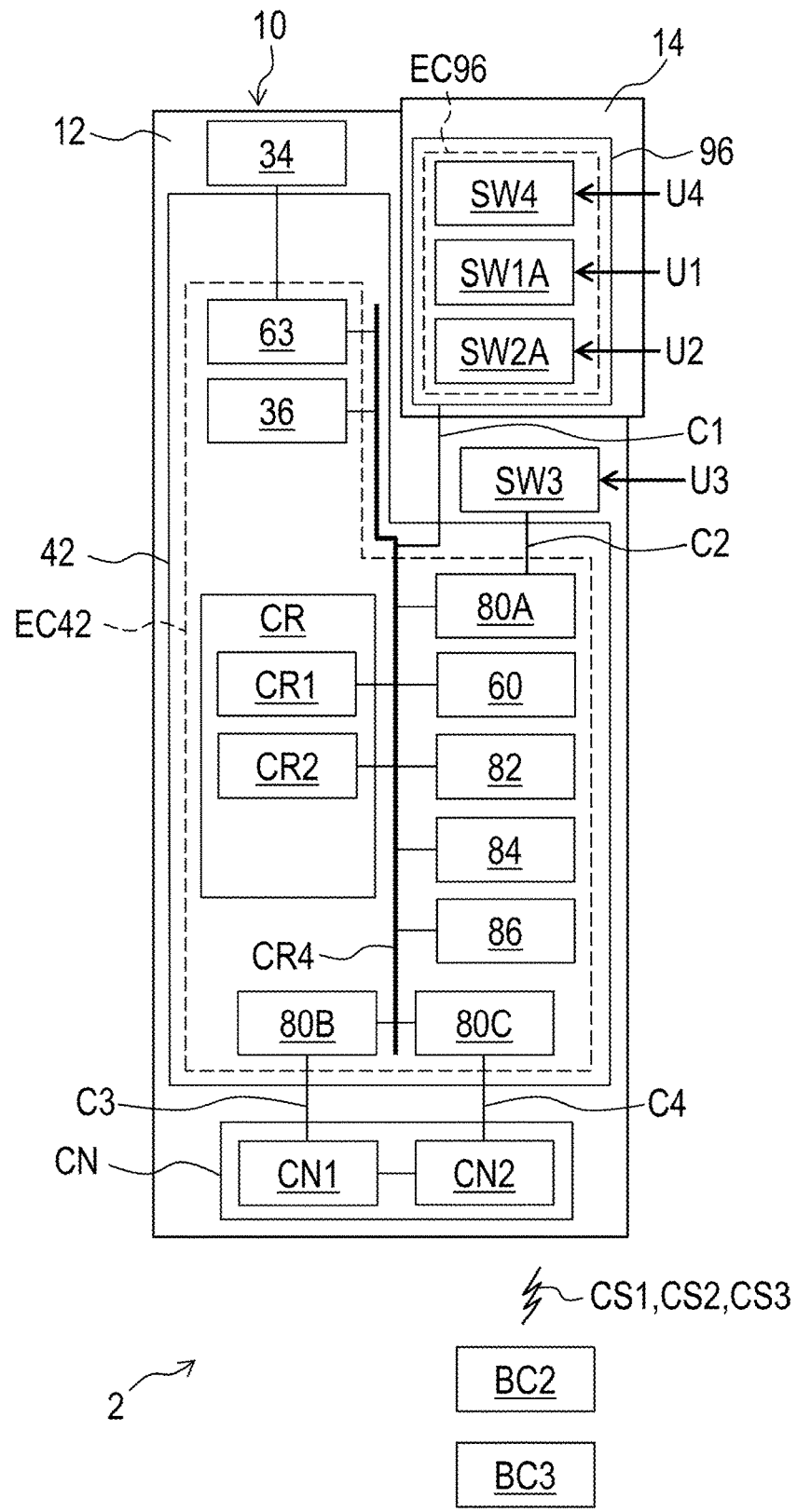
FIG. 15 is a block diagram of the operating device in accordance with the modification, with an additional substrate with which a first substrate is replaced.

As seen in FIG. 14, the first electric component EC40 electrically mounted on the first substrate 40 can be electrically mounted on the second substrate 42. Namely, the plurality of second electric components EC42 can include the electric power source 36 and the voltage controller 63. In this modification, as seen in FIGS. 14 and 15, the first substrate 94 is replaceable with the additional substrate 96. The third substrate 56 is omitted from the operating device 10.

Figure 16:
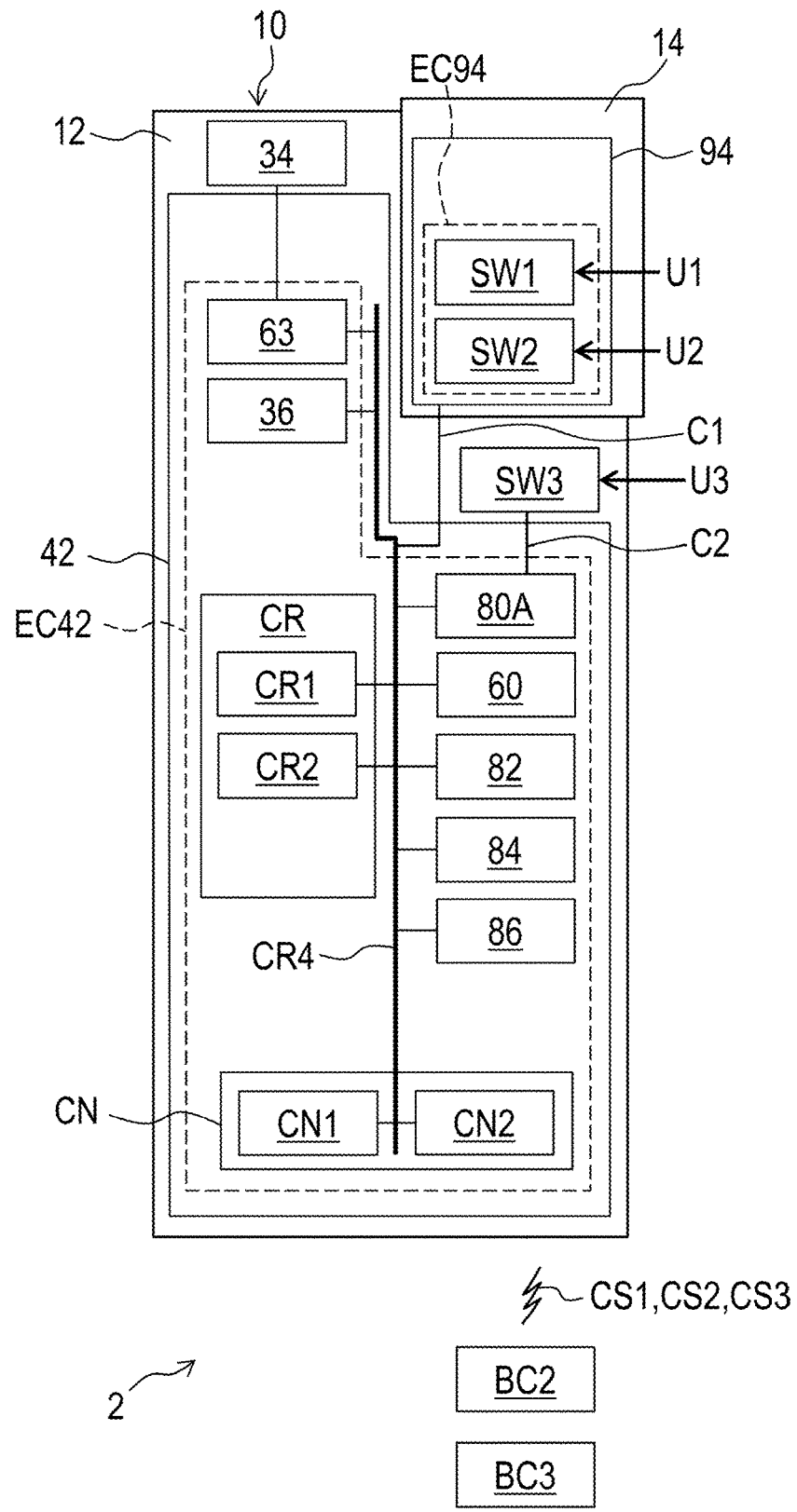
FIG. 16 is a block diagram of the operating device in accordance with another modification.
Figure 17:
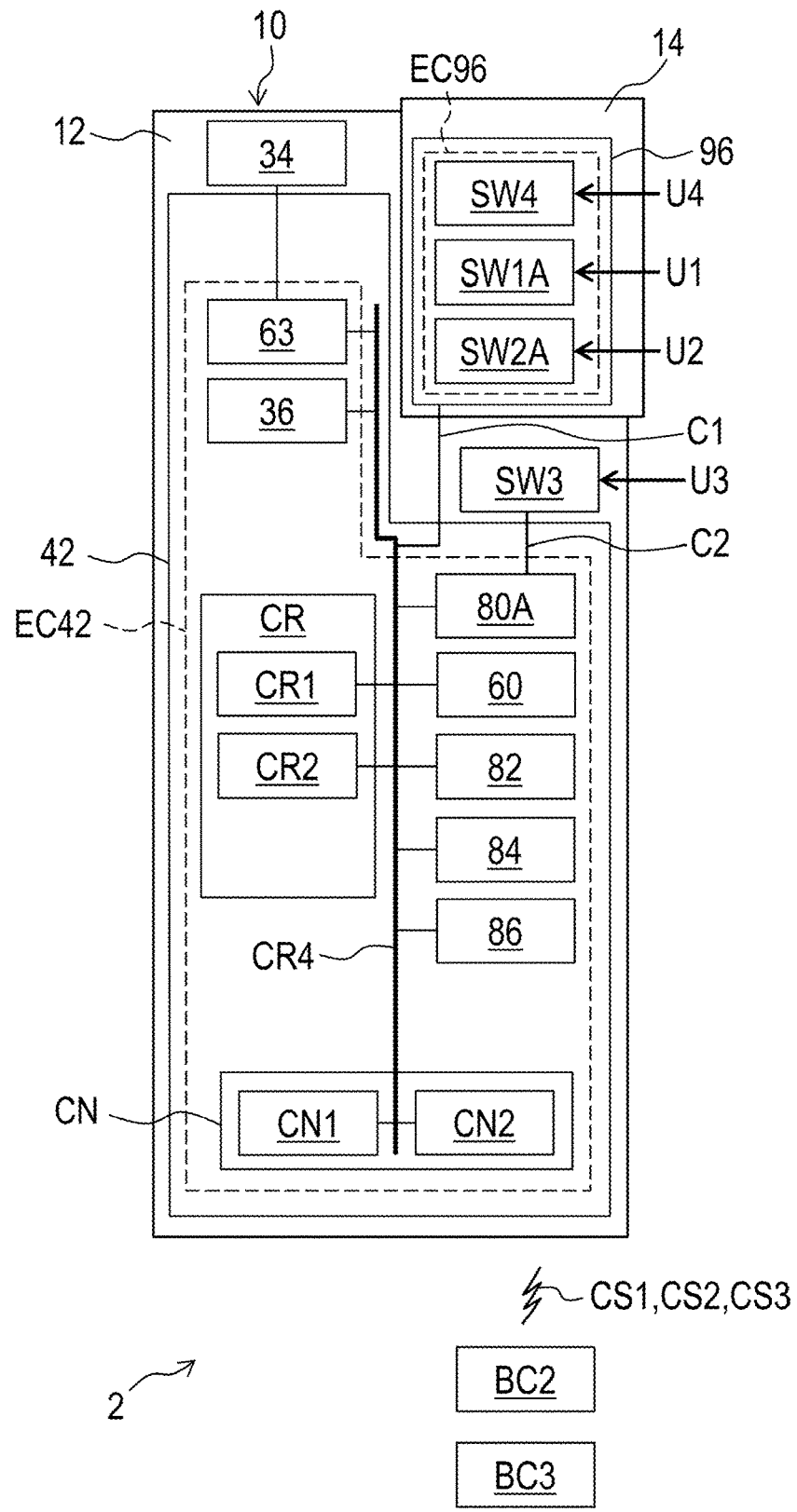
FIG. 17 is a block diagram of the operating device in accordance with another modification, with an additional substrate with which a first substrate is replaced.
Figure 18:
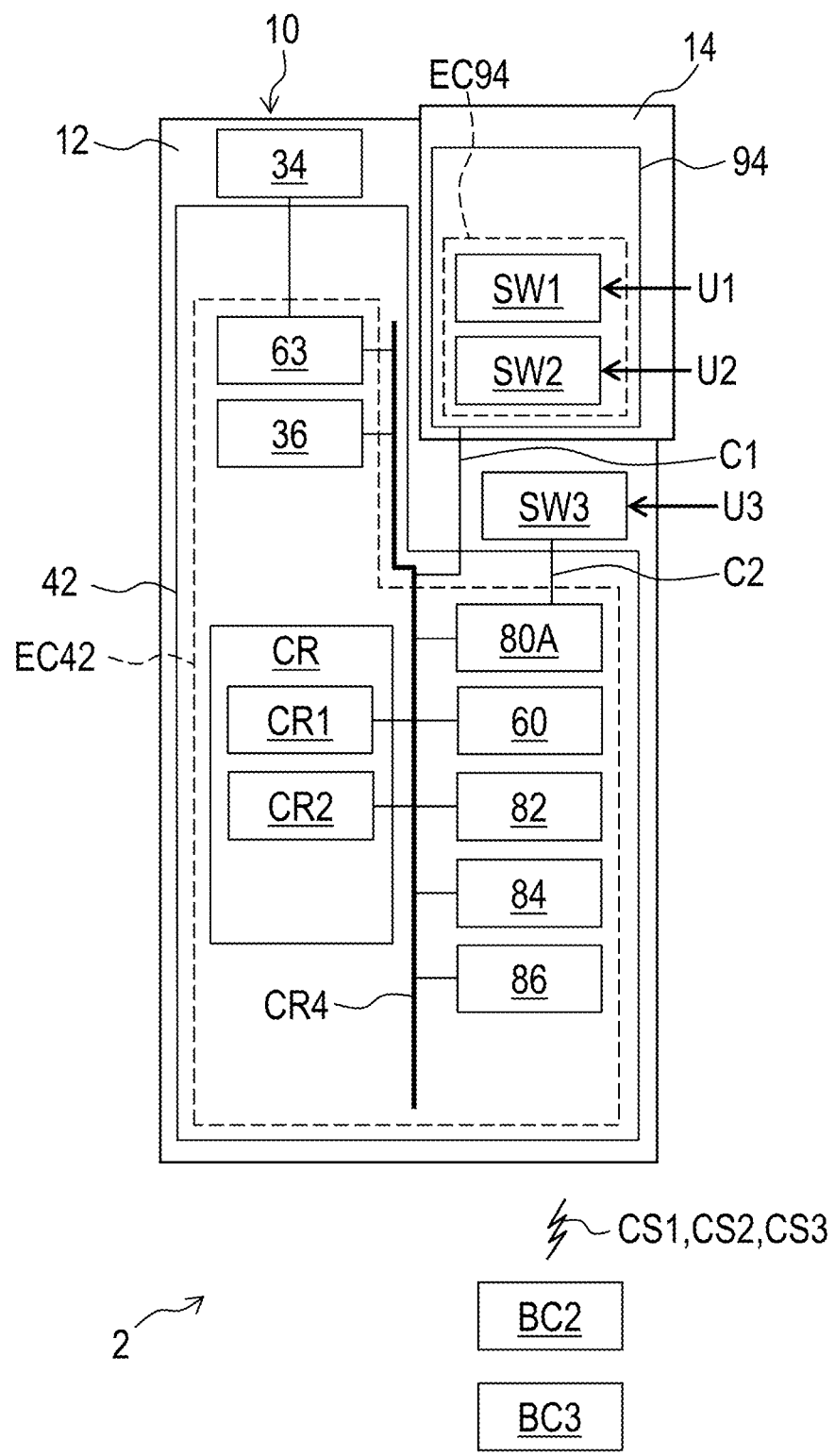
FIGS. 18 to 24 are block diagrams of the operating device in accordance with other modifications.

As seen in FIG. 16, the connector CN can be directly mounted on the second substrate 42. Namely, the plurality of second electric components EC42 can include the connector CN. In this modification, as seen in FIGS. 16 and 17, the first substrate 94 is replaceable with the additional substrate 96. The third substrate 56 is omitted from the operating device 10. Furthermore, as seen in FIG. 18, the connector CN can be omitted from the operating device 10 depicted in FIGS. 14 and 16.

Figure 19:
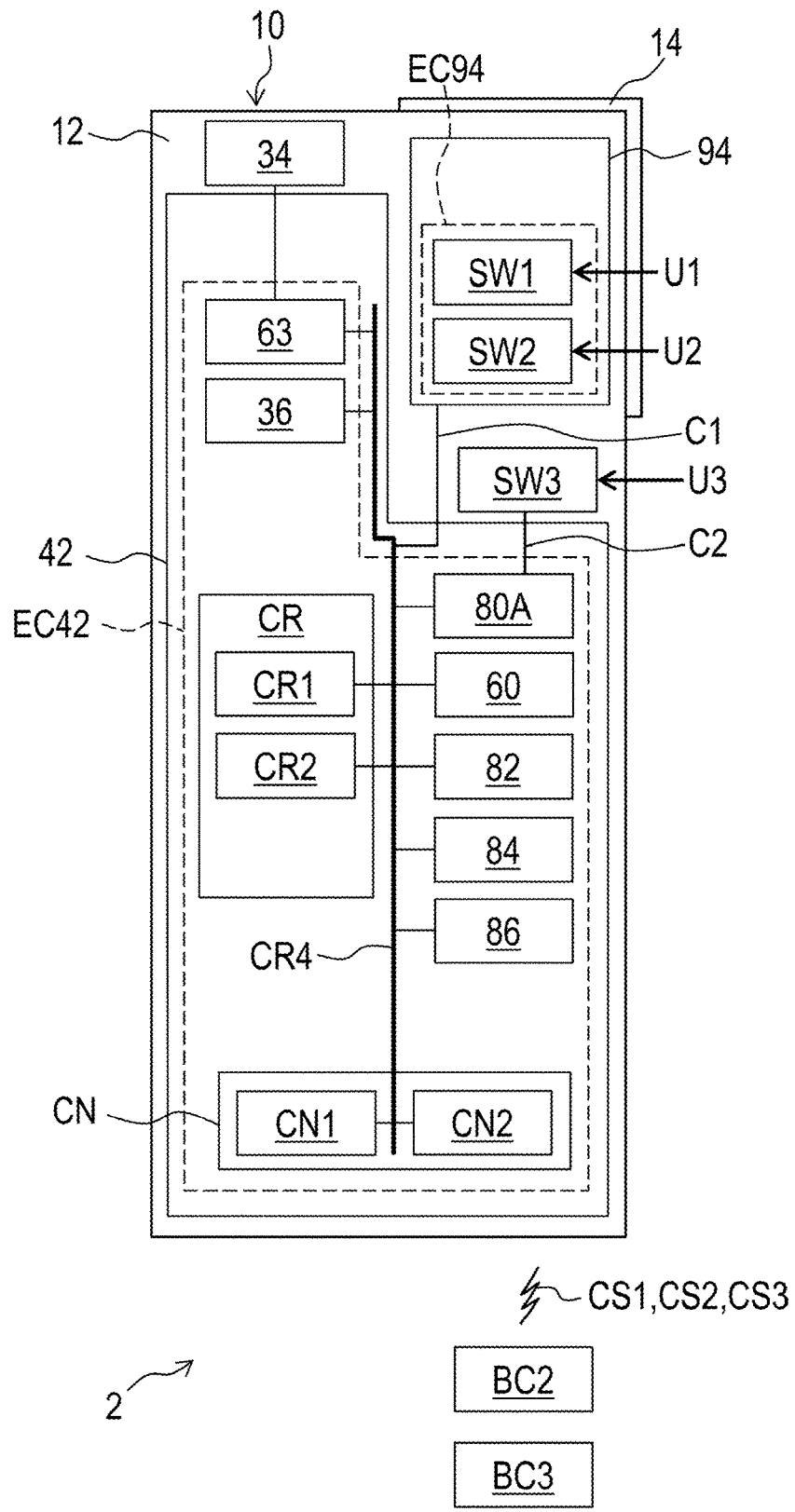
Figure 20:
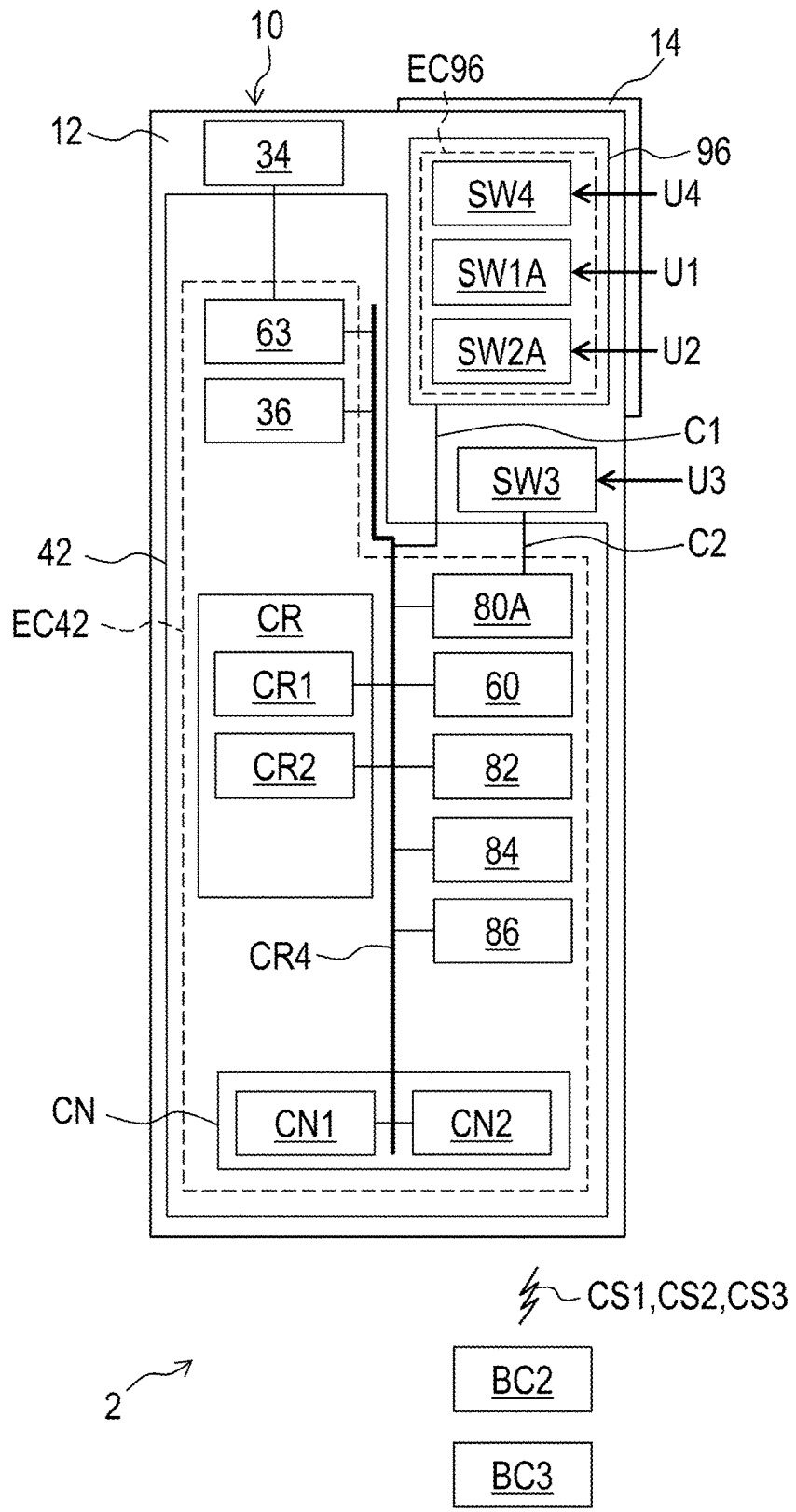

As seen in FIG. 19, the first substrate 94 can be provided to the base member 12 in the operating device 10 depicted in FIG. 16. As seen in FIGS. 19 and 20, the first substrate 94 is replaceable with the additional substrate 96.

Figure 21:
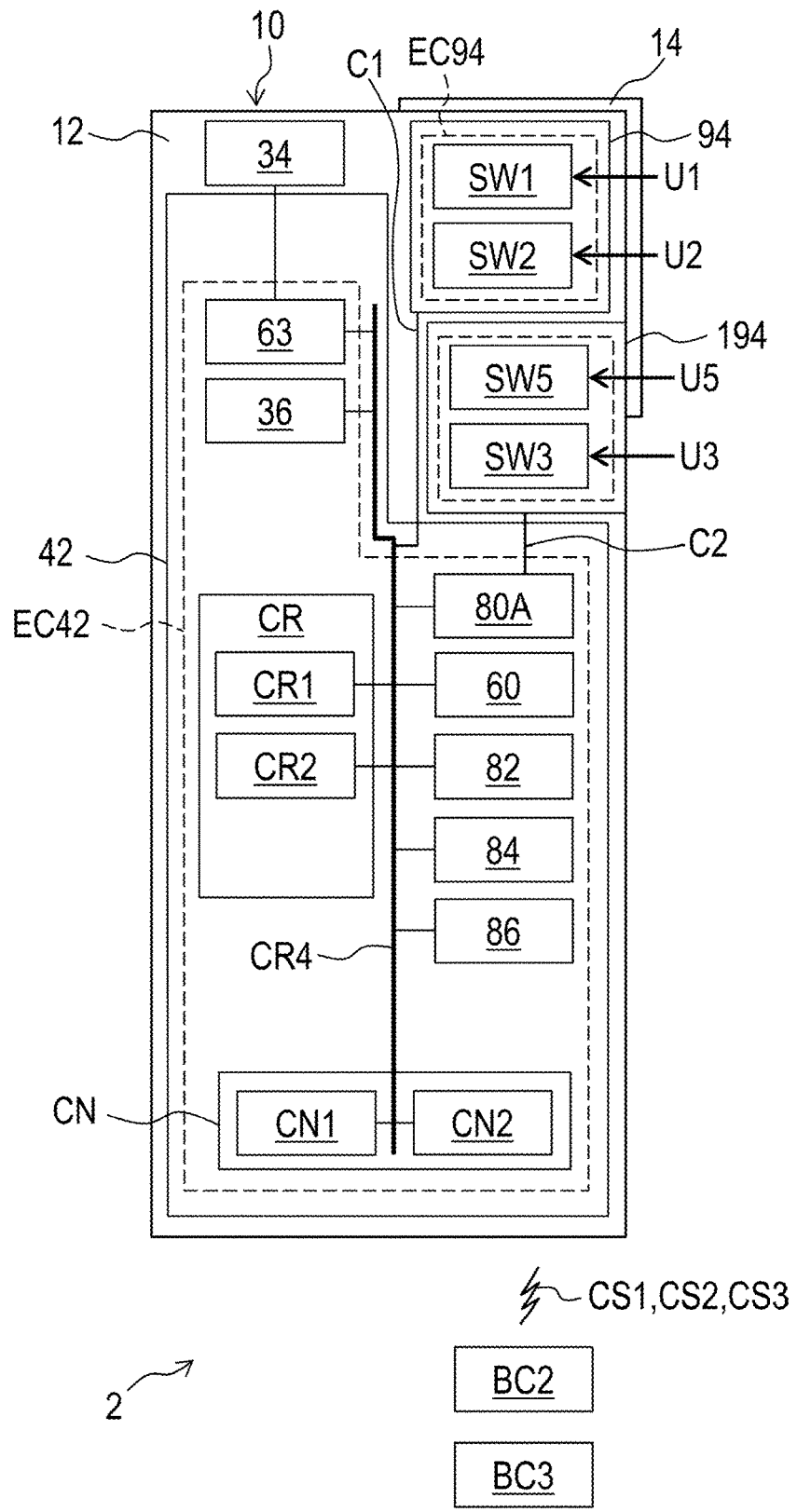

As seen in FIG. 21, the operating device 10 can include a first substrate 194 in addition to the first substrate 94. The first substrate 194 is provided to one of the base member 12 and the operating member 14. In this modification, the first substrate 194 is provided to the base member 12. The first substrate 194 has substantially the same structure as the structure of the first substrate 94. The first substrate 194 is a separate substrate from the first substrate 94. The operating device 10 further comprises at least one first electric component EC194 electrically mounted on the first substrate 194. The at least one first electric component EC194 includes the switches SW3 and SW5. The switch SW5 is configured to receive a user input U5. The switch SW5 has substantially the same structure as the structures of the switches SW1, SW2, and SW3. The switches SW3 and SW5 are electrically mounted on the first substrate 194. For example, the first substrate 94 is replaceable with the additional substrate 96 illustrated in FIGS. 13, 15, 17, and 20. The first substrate 194 is replaceable with the additional substrate 96 illustrated in FIGS. 13, 15, 17, and 20.

Figure 22:
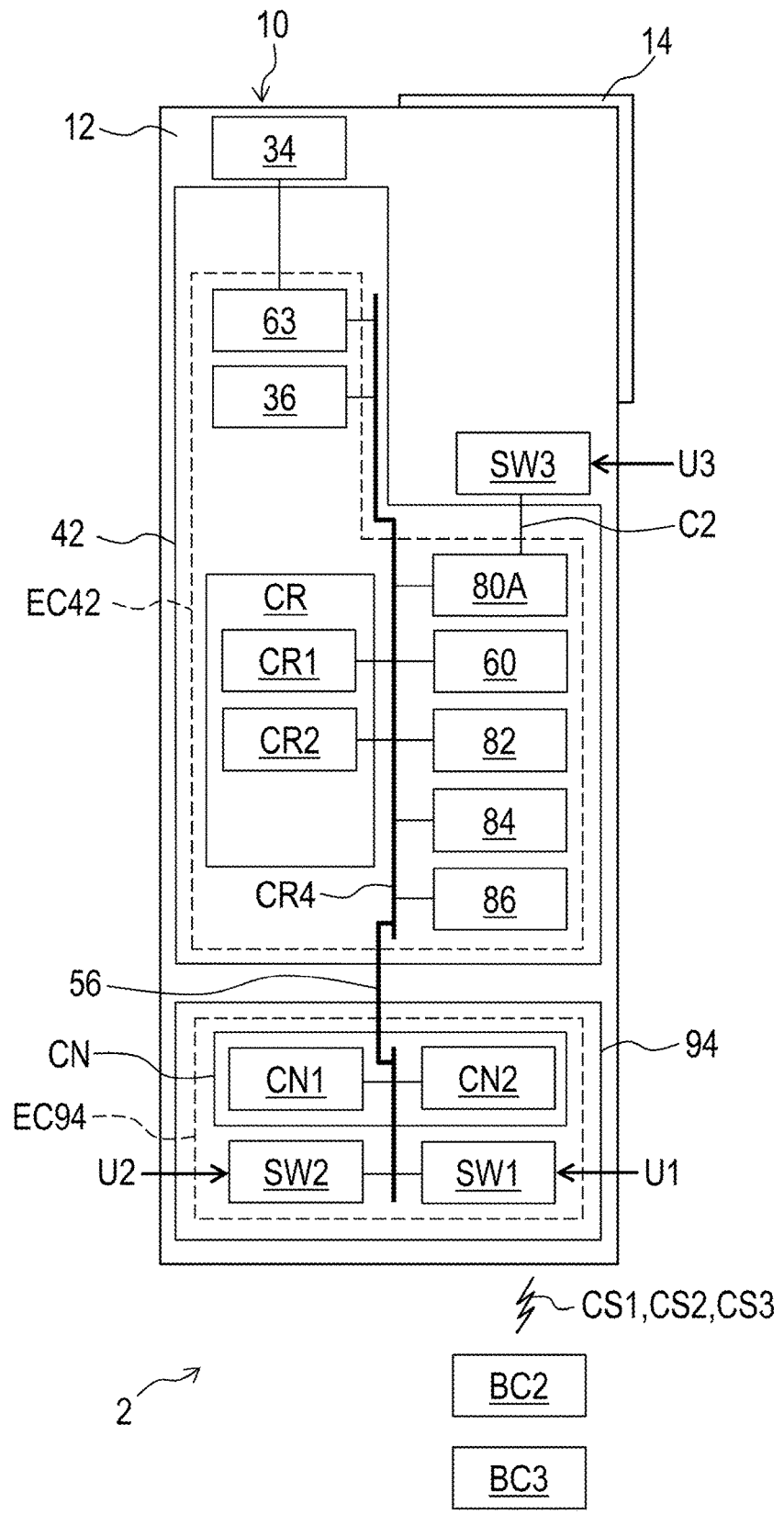

As seen in FIG. 22, the connector CN can be electrically mounted on the first substrate 94. In this modification, the at least one first electric component EC94 includes the switches SW1 and SW2 and the connector CN. For example, the first substrate 94 is replaceable with the additional substrate 96 illustrated in FIGS. 13, 15, 17, and 20.

Figure 23:
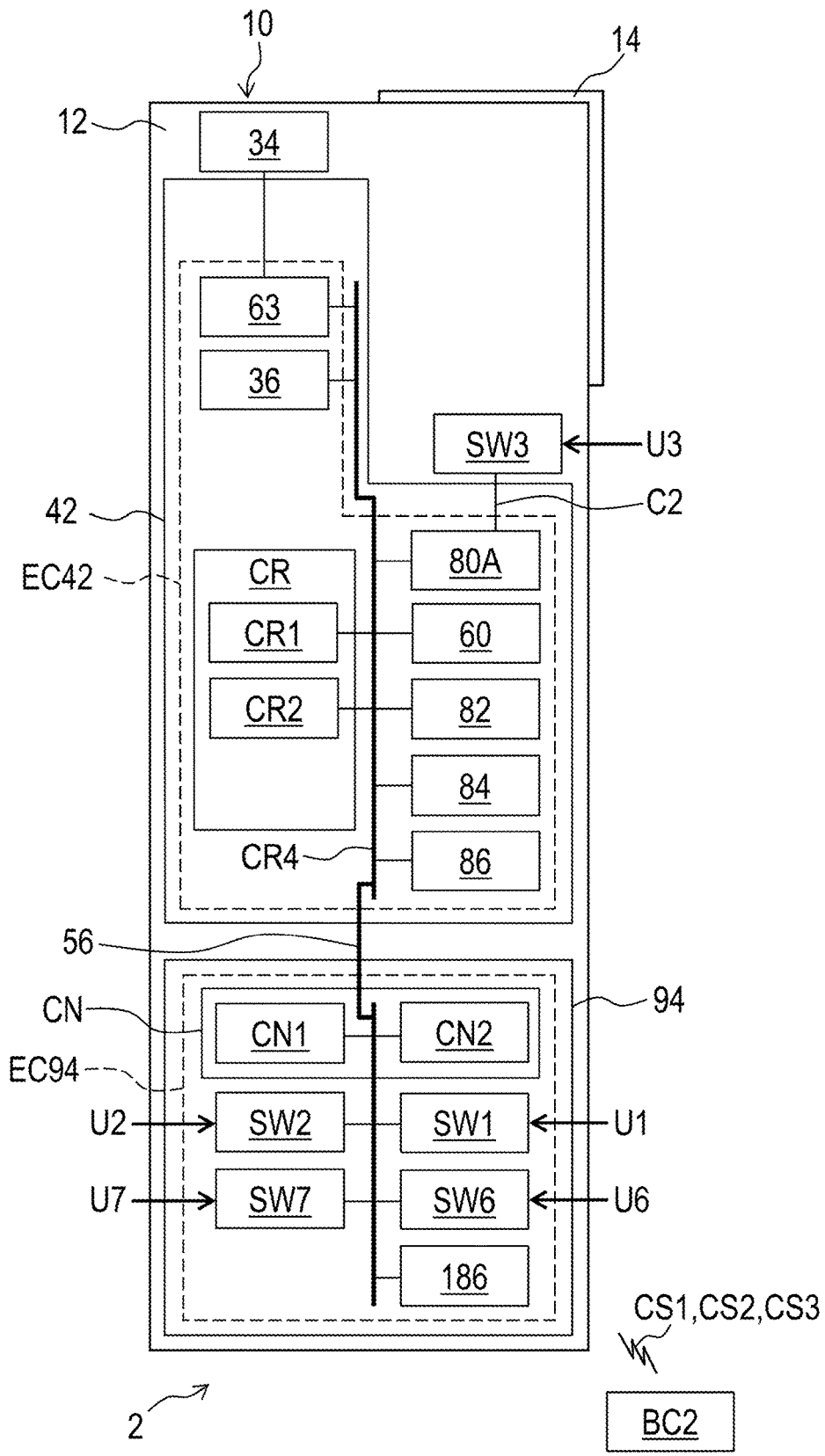

As seen in FIG. 23, an additional informing unit 186 and switches SW6 and SW7 can be electrically mounted on the first substrate 94 in addition to the connector CN. The informing unit has substantially the same structure as the structure of the informing unit 86. The switches SW6 and SW7 have substantially the same structure as the structure of the switches SW1 and SW2. The switch SW6 is configured to receive a user input U6. The switch SW7 is configured to receive a user input U7. In this modification, the at least one first electric component EC94 includes the informing unit 186, the switches SW1, SW2, SW6, and SW7, and the connector CN. The first substrate 94 is electrically connected to the second substrate 42 via the third substrate 56. For example, the first substrate 94 is replaceable with the additional substrate 96 illustrated in FIGS. 13, 15, 17, and 20.

Figure 24:
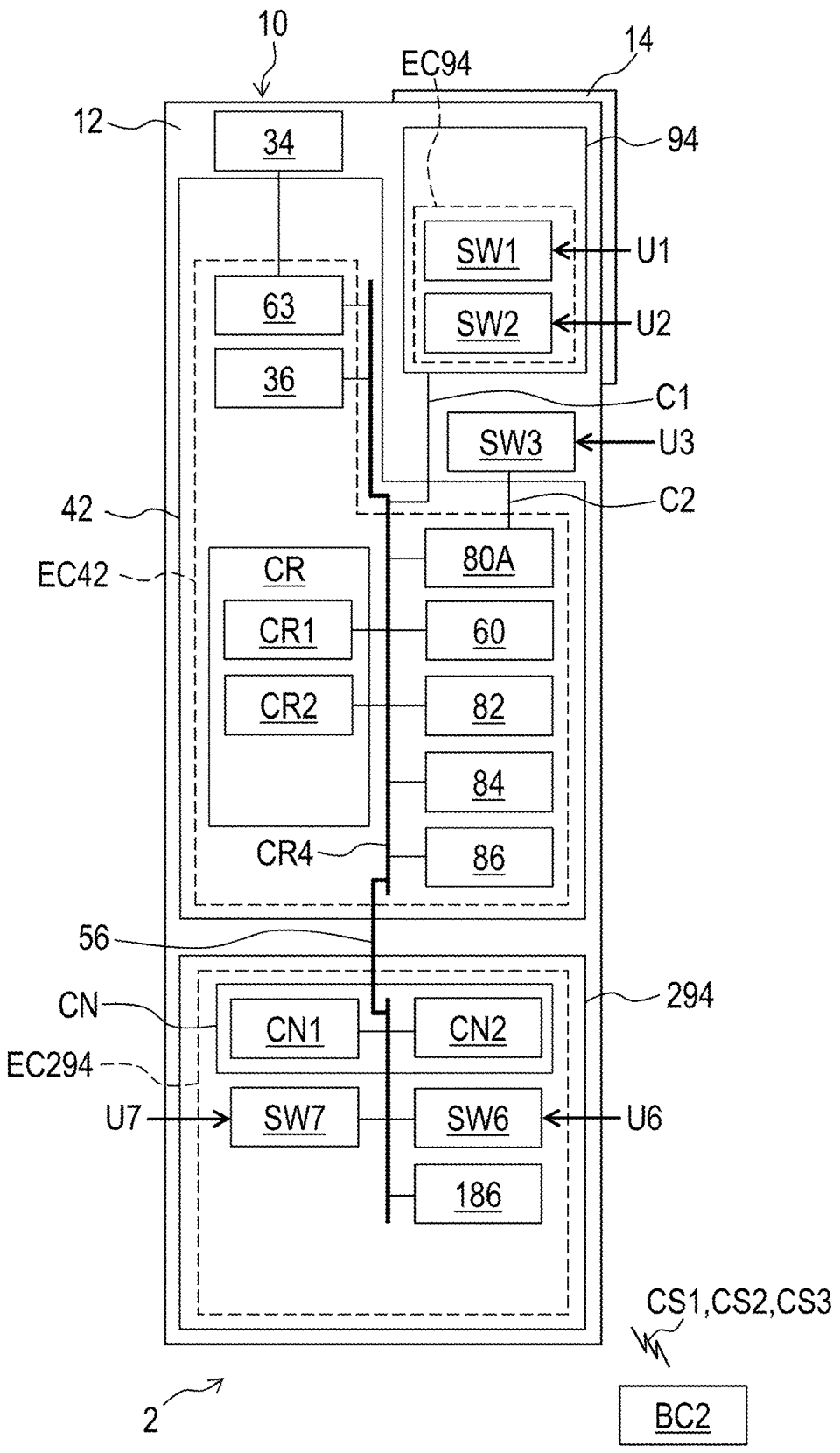

As seen in FIG. 24, the operating device 10 can include a first substrate 294 in addition to the first substrate 94. The first substrate 294 is provided to one of the base member 12 and the operating member 14. In this modification, the first substrate 294 is provided to the base member 12. The first substrate 294 has substantially the same structure as the structure of the first substrate 94. The first substrate 294 is a separate substrate from the first substrate 94. The operating device 10 further comprises at least one first electric component EC294 electrically mounted on the first substrate 294. The at least one first electric component EC294 includes the informing unit 186, the switches SW6 and SW7, and the connector CN. The informing unit 186, the switches SW6 and SW7, and the connector CN are electrically mounted on the first substrate 294. The first substrate 294 is electrically connected to the second substrate 42 via the third substrate 56. For example, the first substrate 94 is replaceable with the additional substrate 96 illustrated in FIGS. 13, 15, 17, and 20. The first substrate 294 is replaceable with the additional substrate 96 illustrated in FIGS. 13, 15, 17, and 20.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base member;
    an operating member movably coupled to the base member;
    a first substrate and a second substrate provided to the base member, the second substrate being separate from the first substrate; and
    at least one first electric component electrically mounted on the first substrate or the second substrate, wherein
    the operating member is pivotally coupled to the base member about a pivot axis, and
    the first substrate extends along a plane parallel to the pivot axis.

2. The operating device according to claim 1, wherein
the first substrate extends along a first reference plane, and
the second substrate extends along a second reference plane different from the first reference plane.

3. The operating device according to claim 2, wherein
the first reference plane is non-parallel to the second reference plane.

4. The operating device according to claim 2, wherein
the first reference plane is perpendicular to the second reference plane.

5. The operating device according to claim 2, wherein
the first substrate has a first minimum length defined in a first direction along the first reference plane,
the second substrate has a second minimum length defined in a second direction along the second reference plane, and
at least one of the first minimum length and the second minimum length is larger than a minimum distance defined between the first substrate and the second substrate.

6. The operating device according to claim 1, further comprising
a third substrate configured to electrically connect the first substrate to the second substrate, the third substrate being a different substrate from the first substrate and the second substrate.

7. The operating device according to claim 6, wherein
the third substrate includes a flexible member configured to electrically connect the first substrate to the second substrate.

8. The operating device according to claim 6, further comprising
a substrate support configured to support the third substrate relative to at least one of the operating member, the base member, the first substrate and the second substrate.

9. The operating device according to claim 8, wherein
the substrate support includes an elastic member.

10. The operating device according to claim 1, wherein
the base member extends in a longitudinal direction and includes
  a first end portion configured to be coupled to a handlebar, and
  a second end portion opposite to the first end portion in the longitudinal direction, and
at least one of the first substrate and the second substrate is accommodated at the second end portion.

11. The operating device according to claim 1, further comprising:
at least one second electric component electrically mounted on the second substrate, wherein
the at least one first electric component is electrically mounted on the first substrate, and
a first total number of the at least one first electric component is different from a second total number of the at least one second electric component.

12. The operating device according to claim 11, wherein
the second total number is larger than the first total number.

13. The operating device according to claim 11, wherein
the at least one second electric component includes at least one of
  a controller including a processor, the controller being configured to control one or more components of the operating device and/or another device in response to user input, and
  an electric power source.

14. The operating device according to claim 1, wherein
the first substrate is electrically connected to the second substrate.

15. A first substrate provided on an operating device for a human-powered vehicle, the operating device including a base member, an operating member movably coupled to the base member, a second substrate provided to one of the base member and the operating member, and at least one second electric component electrically mounted on the second substrate, the first substrate comprising:
at least one first electric component, wherein
a first total number of the at least one first electric component is different than a second total number of the at least one second electric component, and
the first substrate is configured to be connected to an additional substrate on which at least one third electric component having a third total number different from the first total number and the second total number.

16. The first substrate according to claim 15, wherein
the second total number of the at least one second electric component is larger than the first total number of the at least one first electric component.

17. The first substrate according to claim 15, wherein
the at least one second electric component includes at least one of
  a controller including a processor, the controller being configured to control one or more components of the operating device and/or another device in response to user input,
  an electric power source, and
  a wireless communicator.

18. The first substrate according to claim 17, wherein
the at least one first electric component includes a switch electrically mounted on the first substrate.

19. An operating device for a human-powered vehicle, comprising:
a base member;
an operating member movably coupled to the base member;
a first substrate provided to one of the base member and the operating member;
a second substrate provided to the one of the base member and the operating member, the second substrate being separate from the first substrate;
at least one first electric component electrically mounted on the first substrate; and
at least one second electric component electrically mounted on the second substrate, wherein
the first electric component is connected to the second electric component, and
at least one of the first electric component and the second electric component is connected to an additional electric component via a cable.

20. The operating device according to claim 19, wherein
the additional electric component includes a switch.

* * * * *